United States Patent
Lukas et al.

(10) Patent No.: US 8,754,746 B2
(45) Date of Patent: *Jun. 17, 2014

(54) HAND-HELD GAMING DEVICE THAT IDENTIFIES USER BASED UPON INPUT FROM TOUCH SENSITIVE PANEL

(75) Inventors: Bob Lukas, Delta (CA); David A. Sobel, Los Altos, CA (US); Monika Gupta, Irvine, CA (US); Qiang Fu, Irvine, CA (US); Sumant Ranganathan, Saratoga, CA (US); Jeyhan Karaoguz, Irvine, CA (US); Tom W. Kwan, Cupertino, CA (US); Xinyu Yu, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 12/912,458

(22) Filed: Oct. 26, 2010

(65) Prior Publication Data

US 2011/0118026 A1 May 19, 2011

Related U.S. Application Data

(60) Provisional application No. 61/261,702, filed on Nov. 16, 2009.

(51) Int. Cl.
| G06F 17/00 | (2006.01) |
| G06F 7/04 | (2006.01) |
| G06F 21/32 | (2013.01) |
| G06F 21/30 | (2013.01) |
| G06F 3/038 | (2013.01) |
| G06F 3/0488 | (2013.01) |
| G06F 3/041 | (2006.01) |

(52) U.S. Cl.
CPC ............... *G06F 21/32* (2013.01); *G06F 21/30* (2013.01); *G06F 3/0383* (2013.01); *G06F 3/0488* (2013.01); *G06F 3/0416* (2013.01)
USPC ............................................ 340/5.82; 463/29

(58) Field of Classification Search
CPC .......... G06F 21/00; G06F 21/30; G06F 21/32
USPC ............... 345/173, 157; 382/115; 463/37, 29; 705/44; 340/5.52, 5.82; 709/204, 223
See application file for complete search history.

(56) References Cited

U.S. PATENT DOCUMENTS 6,886,036 B1 *  4/2005  Santamaki et al. ........... 709/223
8,027,518 B2 *  9/2011  Baker et al. .................. 382/115

(Continued)

FOREIGN PATENT DOCUMENTS

CN   101344915   1/2009

*Primary Examiner* — Dmitry Suhol
*Assistant Examiner* — Jason Yen
(74) *Attorney, Agent, or Firm* — Garlick & Markison; Kevin L. Smith

(57) ABSTRACT

Operating a game controller to identify a user by receiving touch pad input from at least one touch sensitive pad of the game controller that has a plurality of touch sensitive elements. The touch pad input corresponds to the user's touch of at least some of the plurality of touch sensitive elements. The touch pad input is at least partially processed by processing circuitry of the game controller and transmitted to a game console via a communications interface of the game controller for processing of the at least partially processed touch pad input to identify the user via pattern recognition. At least partially processing the touch pad input can be by identifying at least one finger orientation, at least one finger spacing, at least one finger width, a plurality of finger knuckle/joint locations, and/or a plurality of finger lengths based upon the touch pad input.

20 Claims, 31 Drawing Sheets

(56) References Cited

U.S. PATENT DOCUMENTS

| | | | |
|---|---|---|---|
| 2003/0157930 A1* | 8/2003 | Morota et al. | 455/418 |
| 2004/0049743 A1* | 3/2004 | Bogward | 715/531 |
| 2005/0084138 A1* | 4/2005 | Inkster et al. | 382/115 |
| 2005/0289058 A1* | 12/2005 | Hoffman et al. | 705/44 |
| 2006/0250213 A1* | 11/2006 | Cain et al. | 340/5.52 |
| 2006/0284853 A1* | 12/2006 | Shapiro | 345/173 |
| 2006/0285725 A1* | 12/2006 | Recce | 382/115 |
| 2007/0124370 A1* | 5/2007 | Nareddy et al. | 709/204 |
| 2008/0036739 A1 | 2/2008 | Juh et al. | |
| 2008/0268956 A1* | 10/2008 | Suzuki | 463/37 |
| 2008/0317292 A1* | 12/2008 | Baker et al. | 382/115 |
| 2009/0002217 A1* | 1/2009 | Kryze et al. | 341/176 |
| 2009/0284532 A1* | 11/2009 | Kerr et al. | 345/442 |
| 2010/0007618 A1* | 1/2010 | Park et al. | 345/173 |
| 2010/0097324 A1* | 4/2010 | Anson et al. | 345/173 |
| 2010/0238111 A1* | 9/2010 | Chen et al. | 345/157 |
| 2010/0248822 A1* | 9/2010 | Migos et al. | 463/29 |
| 2010/0289754 A1* | 11/2010 | Sleeman et al. | 345/173 |
| 2011/0028194 A1* | 2/2011 | Tang et al. | 463/1 |
| 2011/0043475 A1* | 2/2011 | Rigazio et al. | 345/173 |

\* cited by examiner

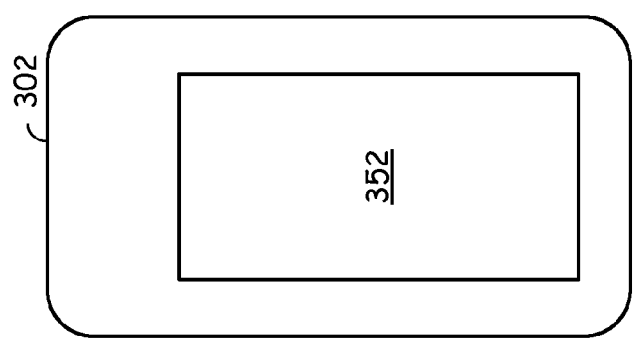
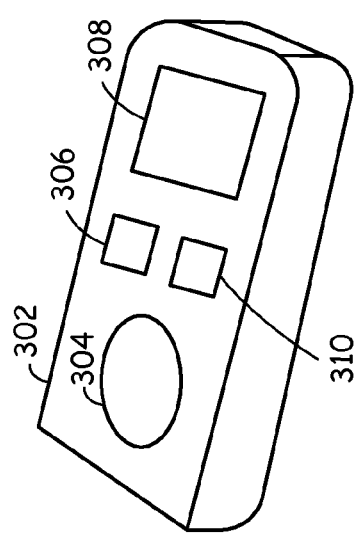
FIG. 3B
FIG. 3A

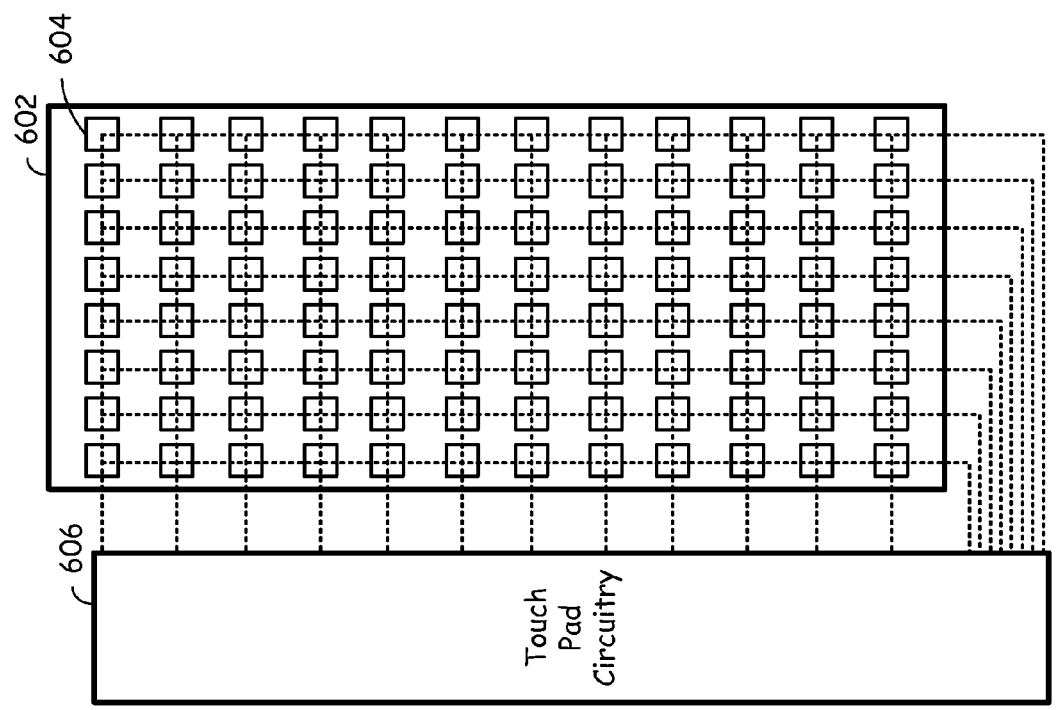

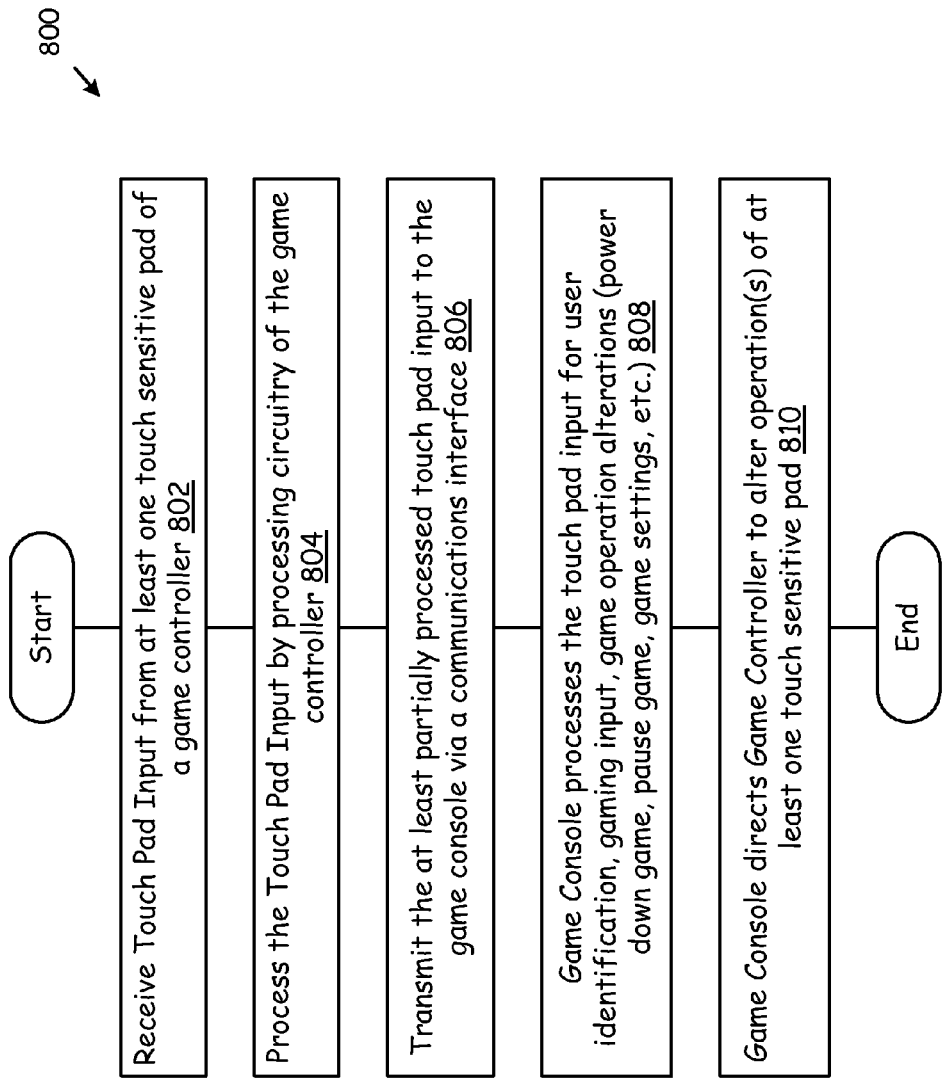

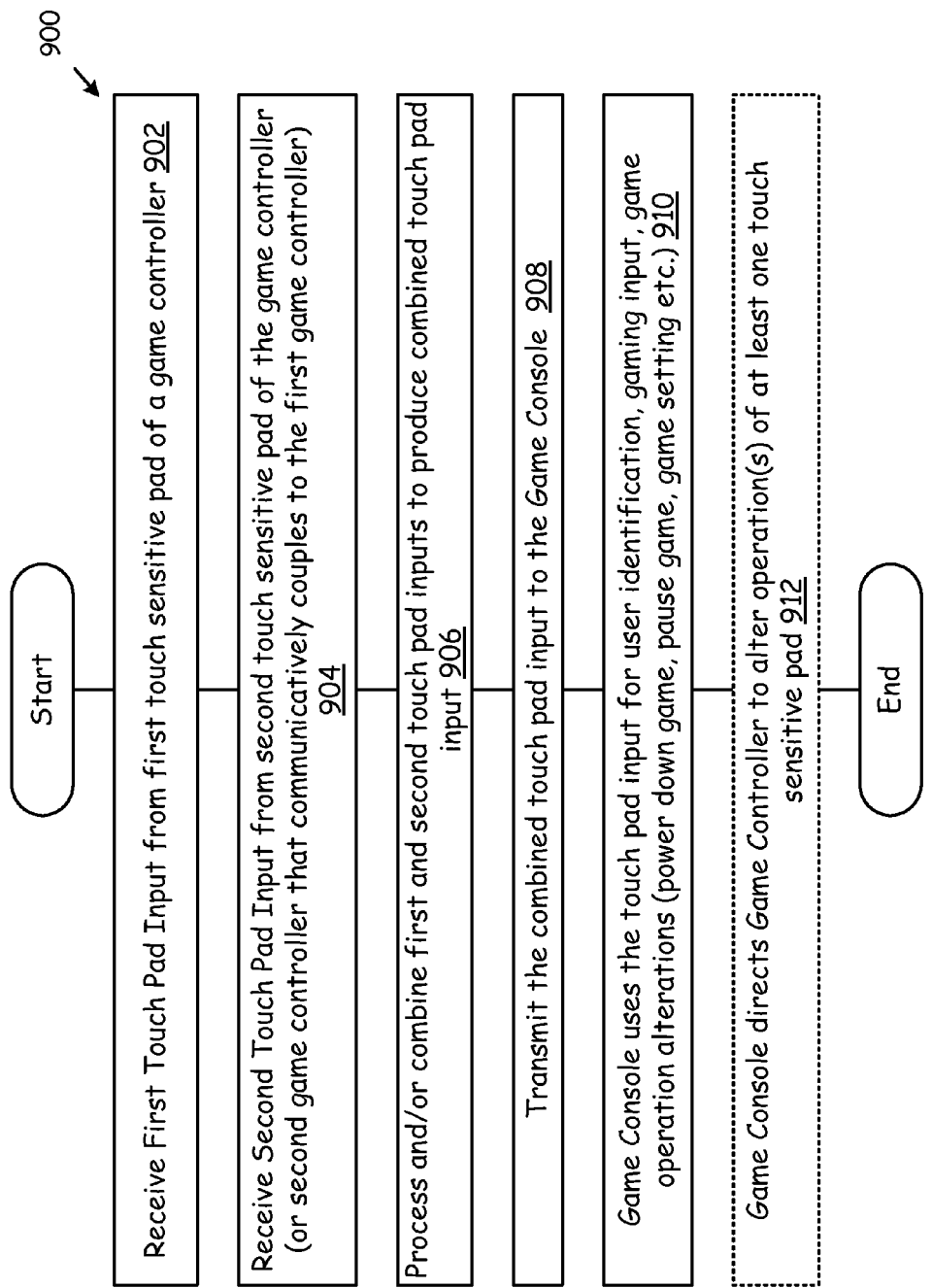

```
┌──────────────────────────────────────┐
│ Receive motion data from motion      │
│ detector of game controller 1402     │
└──────────────────────────────────────┘
┌──────────────────────────────────────┐
│ Use the motion data to assist in     │
│ identifying the user 1404            │
└──────────────────────────────────────┘

FIG. 14A
```

```
┌──────────────────────────────────────┐
│ Capture voice data from microphone   │
│ of game controller 1452              │
└──────────────────────────────────────┘
┌──────────────────────────────────────┐
│ Use the voice data to assist in      │
│ identifying the user 1454            │
└──────────────────────────────────────┘

FIG. 14B
```

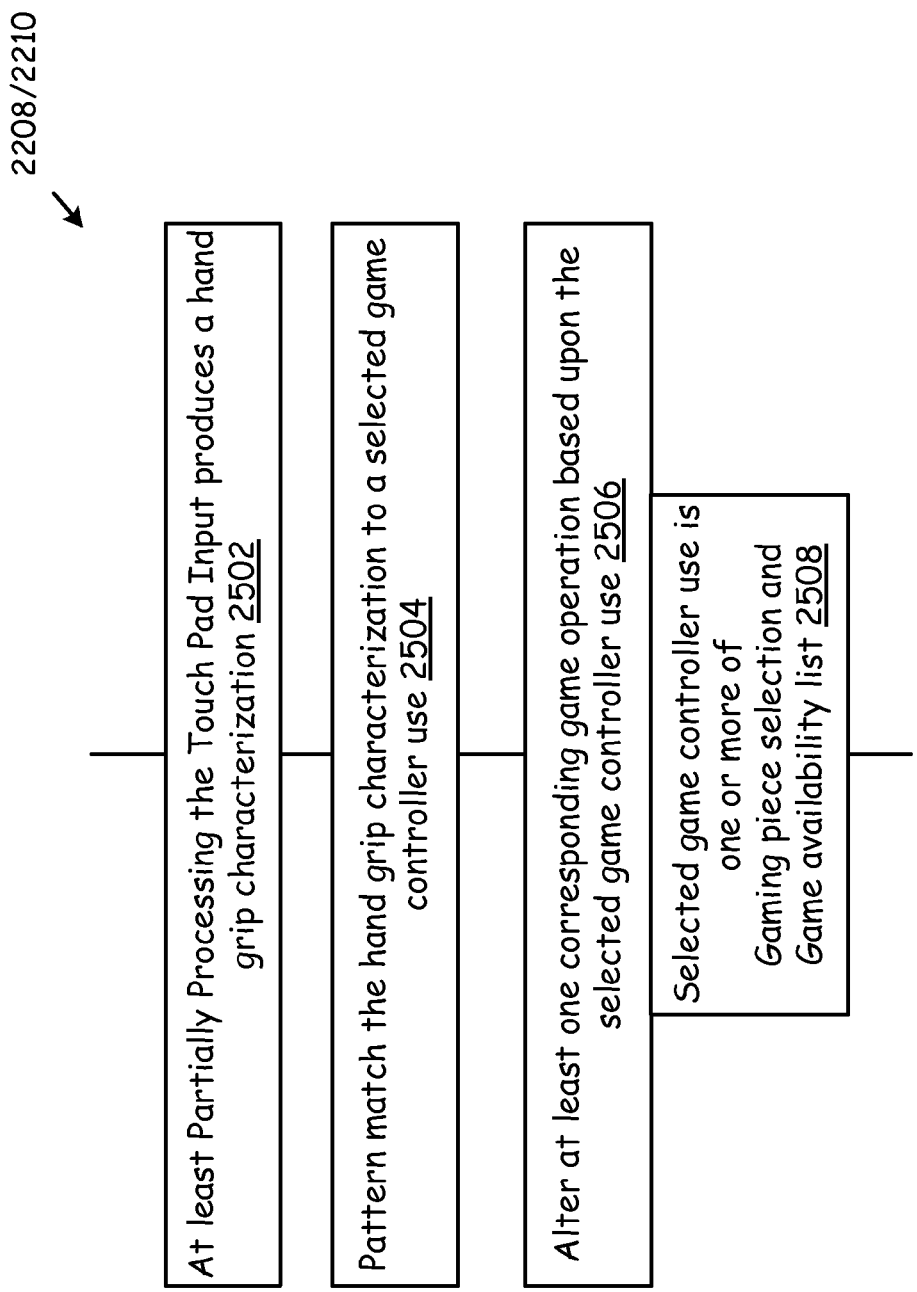

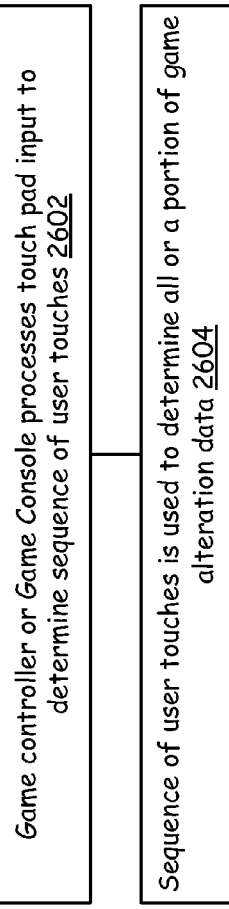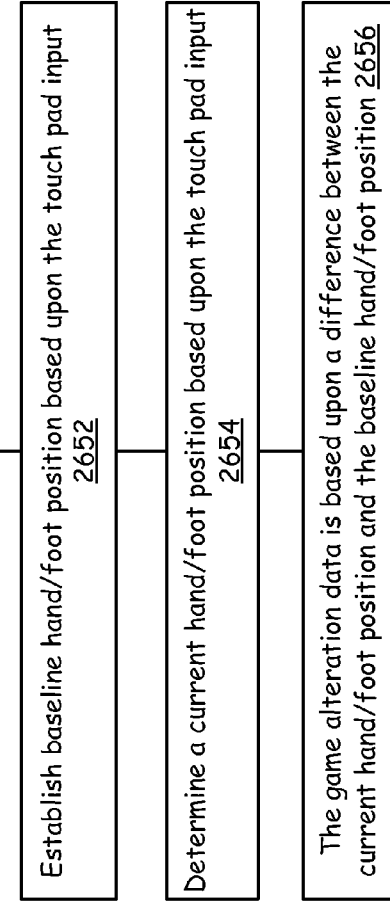

HAND-HELD GAMING DEVICE THAT IDENTIFIES USER BASED UPON INPUT FROM TOUCH SENSITIVE PANEL

CROSS-REFERENCE TO PRIORITY APPLICATION

The present U.S. Utility Patent Application claims priority pursuant to 35 U.S.C. §119(e) to U.S. Provisional Application Ser. No. 61/261,702, entitled "TOUCH PAD USER IDENTIFICATION, GAMING INPUT, AND PREFERENCE INPUT," filed Nov. 16, 2009, which is hereby incorporated herein by reference in its entirety and made part of the present U.S. Utility Patent Application for all purposes.

BACKGROUND OF THE INVENTION

1. Field of the Invention

The present invention relates generally to electronic gaming devices; and more particularly to game controllers of video gaming devices.

2. Description of the Related Art

User gaming devices are fairly well known. These devices include game consoles with communicatively coupled controllers such as Nintendo game consoles, Sony game consoles, Microsoft game consoles, and various other game console devices. These game consoles couple to a television, may couple to an audio system, and support user game playing. Some of these game consoles support wireless communications with handheld game controllers and/or other game controllers. For example, the Nintendo Wii includes handheld controllers that detect their orientation to some degree, acceleration to some degree, and receive standard button inputs from a user. This information is wirelessly relayed to the game controller to control operation of corresponding game elements within the gaming environment. Other game controllers may include simulated game pieces such as musical instruments, baseball bats, golf clubs, and various other types of simulated devices.

With the continued advancement of technology, the complexities and capabilities of game consoles have become advanced. The game controllers support sophisticated gaming inputs received via numerous input sources, e.g., buttons, accelerometers, IR orientation detectors, positional detectors, and various other gaming inputs. The gaming environment in which these gaming inputs are received is very complex, providing a fairly realistic experience for a user of the gaming device/console. While some games supported by a game console may support only a few gaming inputs, other games require a large number of gaming inputs.

Most game consoles support many differing games, which are software controlled via respective software programming. Sometimes game controllers are specific to the particular game being supported, e.g., guitar hero, rock star, and various other particular types of games. In such a case, these various types of inputs must be supported by differing unique game controllers. The expense and complexity of the multiple game controllers can be overwhelming for some users from a cost standpoint.

Many gaming systems are contained within one unit such as the Nintendo Game Boy and its successors and the Sony Play Station and its successors, for example. These gaming systems include processing resources and a user interface contained within a single unit. With these units, various buttons receive user input while a display and speakers provide user output. Because of the limited battery life available for these units, their functionality has been limited in some regard.

Audio/video entertainment systems that include cable boxes, satellite boxes, and audio visual components typically include one or more remote control devices. These remote control devices allow users to remotely control system operation. Such technology is very old and has been prevalent for a number of years. However, one problem with these devices is that the operation generally of the set-top box is generic to all users and must be uniquely programmed if desired for a particular user. However, this particular programming in other settings is typically applied across the board to all potential users of the device.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

BRIEF DESCRIPTION OF THE DRAWINGS

FIG. 3A is a first perspective view of a game controller constructed according to one or more embodiments of the present invention;

FIG. 3B is a second perspective view of the game controller of FIG. 3A that is constructed according to one or more embodiments of the present invention;

FIG. 6 is a block diagram illustrating a touch sensitive pad and touch pad circuitry constructed according to one or more embodiments of the present invention;

FIG. 8 is a flowchart illustrating operations of a game controller and a game console to receive and process touch pad input according to one or more embodiments of the present invention;

FIG. 9 is a flowchart illustrating other operations of a game controller and a game console to receive and process touch pad input according to one or more embodiments of the present invention;

FIG. 14A is a flowchart illustrating the use of motion data to assist in identifying a user according to one or more embodiments of the present invention;

FIG. 14B is a flowchart illustrating the use of voice data to assist in identifying a user according to one or more embodiments of the present invention;

FIG. 25 is a flowchart illustrating altering at least one game operation based upon a determined game controller use according to one or more embodiments of the present invention;

FIG. 26A is a flowchart illustrating the operation of a gaming system in the receipt of a sequence of user touches to determine game alteration data according to one or more embodiments of the present invention;

FIG. 26B is a flowchart illustrating the operation of a gaming system in determining game alteration data based upon a difference between current hand/foot position and baseline hand/foot position according to one or more embodiments of the present invention;

DETAILED DESCRIPTION

Figure 1:
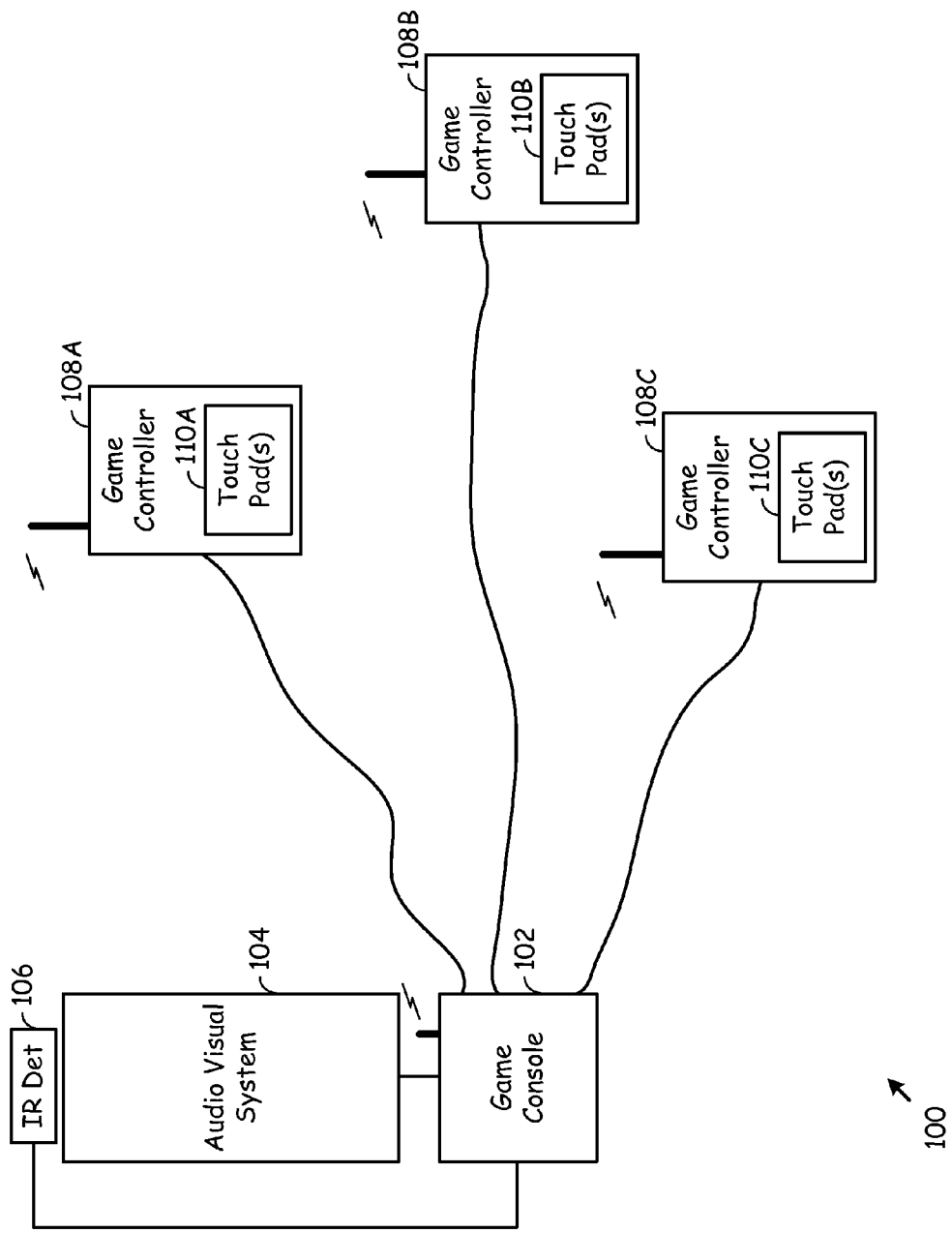
FIG. 1 is a system diagram illustrating a video game system constructed according to one or more embodiments of the present invention.

FIG. 1 is a system diagram illustrating a video game system constructed according to one or more embodiments of the present invention. The gaming system 100 of FIG. 1 includes a game console 102 and a plurality of game controllers 108A, 108B, and 108C. The game console 102 couples to an audio/visual system 104 that includes a video monitor and an audio system. The game console 102 also couples to an infrared (IR) detector 106.

The game controllers 108A, 108B, and 108C communicate with the game console 102 via one or more of a wired and/or wireless communication link. The wired communication link may be a tethered controller including conductors that support wired communications. Wireless communications may be in various RF frequency bands and/or in the infrared range. Thus, each of the game controllers 108A, 108B, and 108C includes communication circuitry that allow the game controllers 108A, 108B, and 108C to communicate with the game console 102.

According to one or more embodiments of the present invention, each of game controllers 108A, 108B, and 108C includes one or more touch sensitive pads/touch pads/touch pads (referred to herein interchangeably) 110A, 110B, and 110C, respectively. According to some aspect of the present invention, the touch pads of the game controllers are used to identify users of the game controllers, to provide gaming input, to determine whether a user is active, and/or to provide other information to the game console 102 for subsequent action. Data captured by the touch pads may be solely processed by a host game controller, e.g., 108A, may be partially processed and transmitted to the game console 102 for further processing, or may be transferred in an unprocessed format from the game controller 108A to the game console 102. Based upon one or more embodiments of the present invention, touch pads are coupled to touch pad circuitry that measures capacitance (inductance or RF propagation) characteristics observed by a plurality of touch sensitive elements of the touch pads. Based upon the capacitive (inductance/RF propagation) information gathered from the touch pads, a user may be identified by game console 102 and/or game controller 108A, 108B, or 108C.

According to one aspect of the present invention as will be further described with reference to the FIGs., the touch pad of a particular game controller includes a plurality of touch sensitive elements, each of which measures a characteristic at its location, i.e., capacitance, inductance, RF propagation characteristics, a combination of these, etc. In various embodiments, capacitance, inductance, RF propagation characteristics, and/or other characteristics of touch sensitive elements are measured over time. Based upon particular touch sensitive element characteristics/values as measured over time, the game controller and/or game console may identify the particular user of the game controller. The user identity may then be used to set the characteristics of the particular game being operated or supported by the game console.

Alternatively, the input received via the touch pads 110A, 110B, and/or 110C may be used for gaming input to the game console to modify operations of the game currently being supported by a game console to modify operation of the game currently being supported by a game console. According to another operation of the present invention, the input received via the touch pad 110A, 110B, and/or 110C may be used to replace button functionality of previous generation game controllers. In such case, the touch pads may have a back lit display that provides representations of replaced buttons. According to various other operations of the present invention, the touch pads are calibrated so as to provide accurate input and/or altered in their operation to enact improved input operations.

The inventive concepts described herein may also be applied to/embodied by a single package video game, i.e., a video game system that is contained in a single housing. In such embodiments, the video game system includes a display, a user input, which includes one or more touch pads, processing components, memory components, and powering components, such as a battery and power circuitry.

Figure 2:
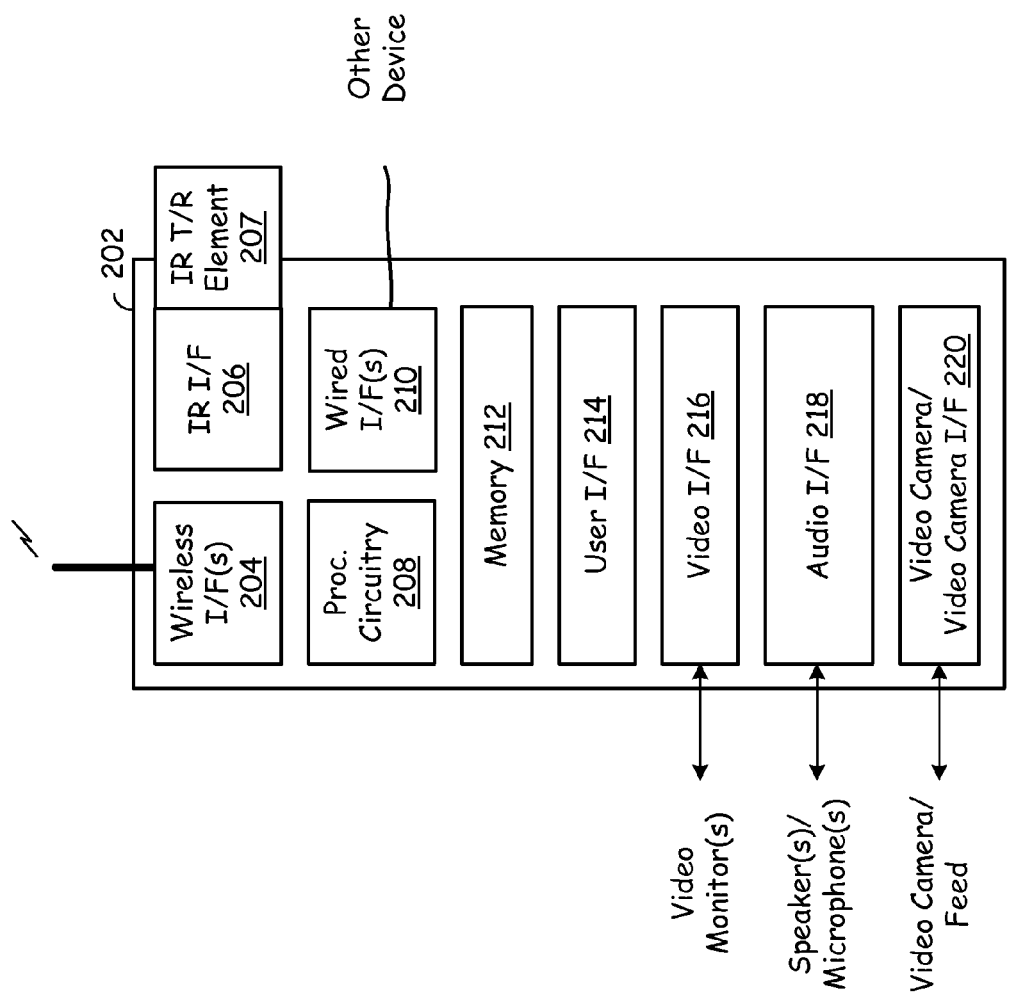
FIG. 2 is a block diagram illustrating a game console constructed according to one or more embodiments of the present invention.

FIG. 2 is a block diagram illustrating a game console constructed according to one or more embodiments of the present invention. The game console 202 of FIG. 2 includes a wireless interface(s) 204, an infrared interface 206, an IR Transmit/Receive element 207, processing circuitry 208, one or more wired interfaces 210, and memory 212. The game console 202 typically also includes a user interface 214, a video interface 216, an audio interface 218, and may include a video camera/video camera interface 220. The wireless interface(s) 204 support wireless communications with at least the game controllers 108A, 108B, and 108C described with reference to FIG. 1. This wireless interface may be a Bluetooth interface, a wireless local area network (WLAN) interface, or another type of wireless communication interface that supports communications between the game console 202 and one or more game controllers. Further, the wireless interface 204 may support communications with a WLAN router or access point, a cellular infrastructure, a satellite communications network, or another type of wireless communications systems.

The IR interface 206 couples to the IR transmit/receive element 207 and supports IR communications with game controllers 108A, 108B, and 108C as shown in FIG. 1. The IR communications between the game console 202 and the game controllers 108A, 108B, and 108C may support an industry standard or proprietary communications protocol. The processing circuitry 208 may include one or more of a system processor, a digital signal processor, a processing module, dedicated hardware, application specific integrated circuit, or other circuitry that is capable of executing software instructions and for processing data. The memory 212 may be RAM, ROM, FLASH RAM, FLASH ROM, an optical memory, magnetic memory, or other types of memory that is capable of storing data and/or instructions in allowing processing circuitry to access same. The wired interface(s) 210 may include a USB interface, a fire wire interface, a serial interface, a parallel interface, an optical interface, or another type of interface supported by a media that is copper, metal, or optical.

The user interface 214 may include a keypad, a video display, cursor control, a touch pad, or other type of interface that allows a user to interface with the game console 202. The video interface 216 couples the game console 202 to one or more video monitors to provide display for the gaming environment supported by game console 202. The communications link between the video interface 216 and the video monitor(s) may be an HDMI interface, a composite video interface, component video interface, an S-video interface, or another type of video interface supported by both the video monitor and the game console 202. The audio interface 218 couples the game console 212 to speakers and/or microphones for audio content delivery and receipt. The video camera/video camera interface 202 may include an onboard video camera or may couple the game console 202 to an external video camera. The external video camera may be used to provide gaming input or other types of information that the game console 202 uses within its operation to produce a gaming environment.

FIG. 3A is a first perspective view of a game controller constructed according to one or more embodiments of the present invention. As shown in FIG. 3A, a game controller 302 includes a cursor control 304, mechanical buttons 310 and 306, and may include a touch pad 308. The cursor control 304 may be a touch pad. When 304 and 308 are both touch pads, they receive touch pad input that may be used for user identification, gaming input, or other operations supported by the gaming system and includes game controller 302.

FIG. 3B is a second perspective view of the game controller 302 of FIG. 3A that is constructed according to one or more embodiments of the present invention. As shown in FIG. 3B, a reverse portion of the game controller 302 may include a touch pad 352. The touch pad 352 may wrap around a back portion of the game controller 302. Alternatively, the touch pad 352 may reside on a battery cover of the game controller 302. As will be described further herein, the touch pad 352 includes a plurality of touch pad locations/touch sensitive elements that receive touch pad input that may be used for user ID, gaming input, and/or other purposes.

Figure 4:
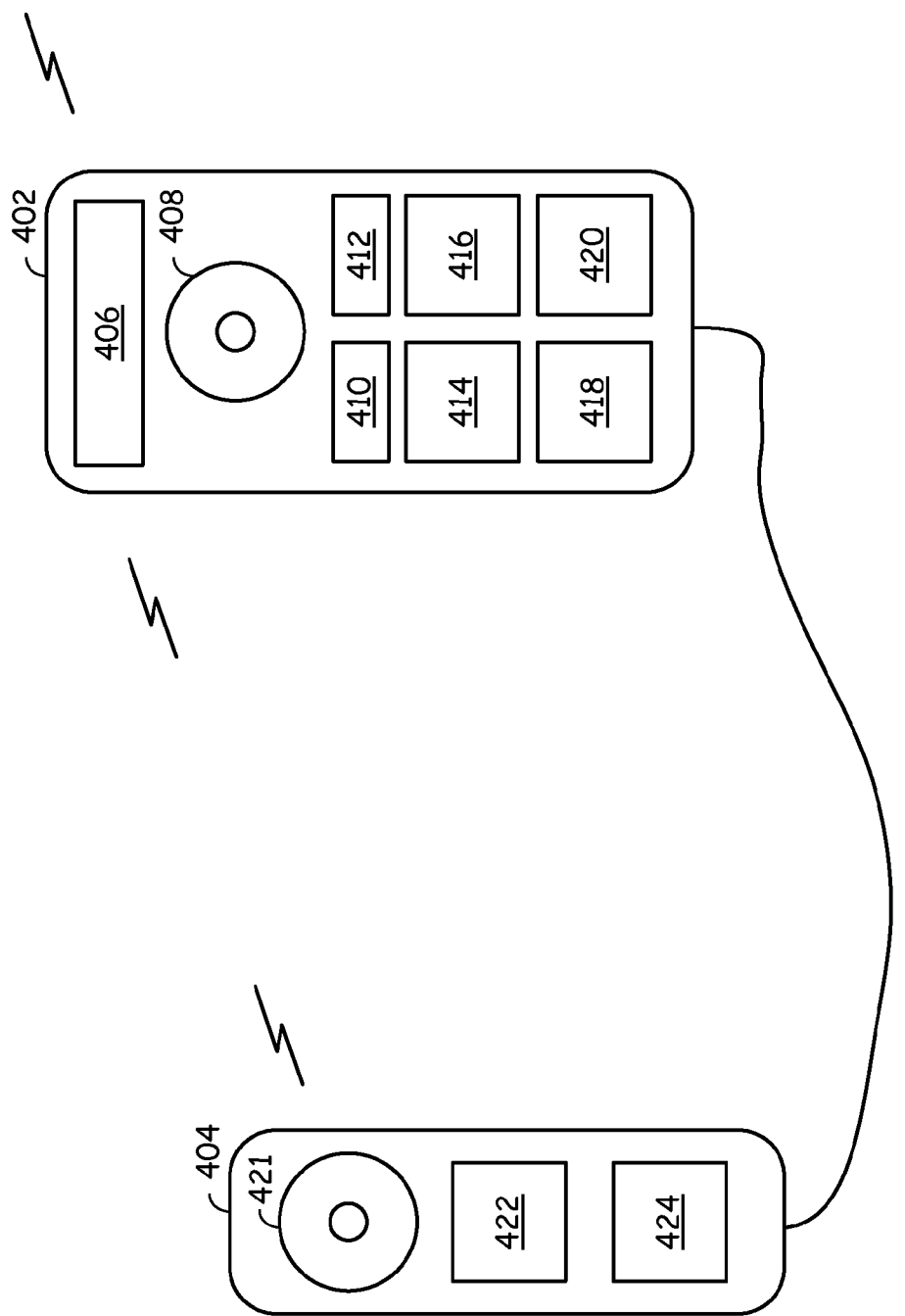
FIG. 4 is a block diagram illustrating a game controller and coupled secondary game controller, both of which are constructed according to one or more embodiments of the present invention.

FIG. 4 is a block diagram illustrating a game controller and coupled secondary game controller, both of which are constructed according to one or more embodiments of the present invention. As shown in FIG. 4, primary game controller 402 includes a display 406, a circular input device 408, and button inputs 410, 412, 414, 416, 418, and 420. Any of these input devices 408, 410, 412, 414, 416, 418, and 420 of primary game controller 402 may be touch pads, as is further described herein. These touch pads receive gaming input in a manner that is consistent with mechanical counterparts that were previously implemented according to prior devices. Further these touch pads may receive input that is used to identify a user or to provide other information.

The primary game controller 402 couples to secondary game controller 404 via either a wired or a wireless interface. The secondary game controller 404 includes input components 421, 422, and 424. These input components of the secondary game controller 404 may be embodied by either mechanical input devices or touch pads. The manner in which touch pads are implemented are described further herein. Data collected from these input components 421, 422, and 424 are relayed to game controller 402, which may process the inputs. Alternately, the input received from input components 421, 422, and/or 424 may be relayed to a servicing game console. The primary game controller 402 and the secondary game controller 404 may both be hand-held devices. Alternately, one or the other of these game controllers may be placed on the floor, inserted into a simulated gaming piece, e.g., guitar, drums, simulated golf club, simulated baseball bat, etc. Each of these game controllers 402 and 404 may capture touch pad input as is further described herein with reference to the FIGs. The touch pad input captured by game controllers 402 and 404 may be processed to produce combined gaming input or transmitted separately to a game console 202. The combined or separate touch pad input may be used as gaming input, may be processed to identify a user, or may be processed to otherwise provide input to a supported video game.

Figure 5:
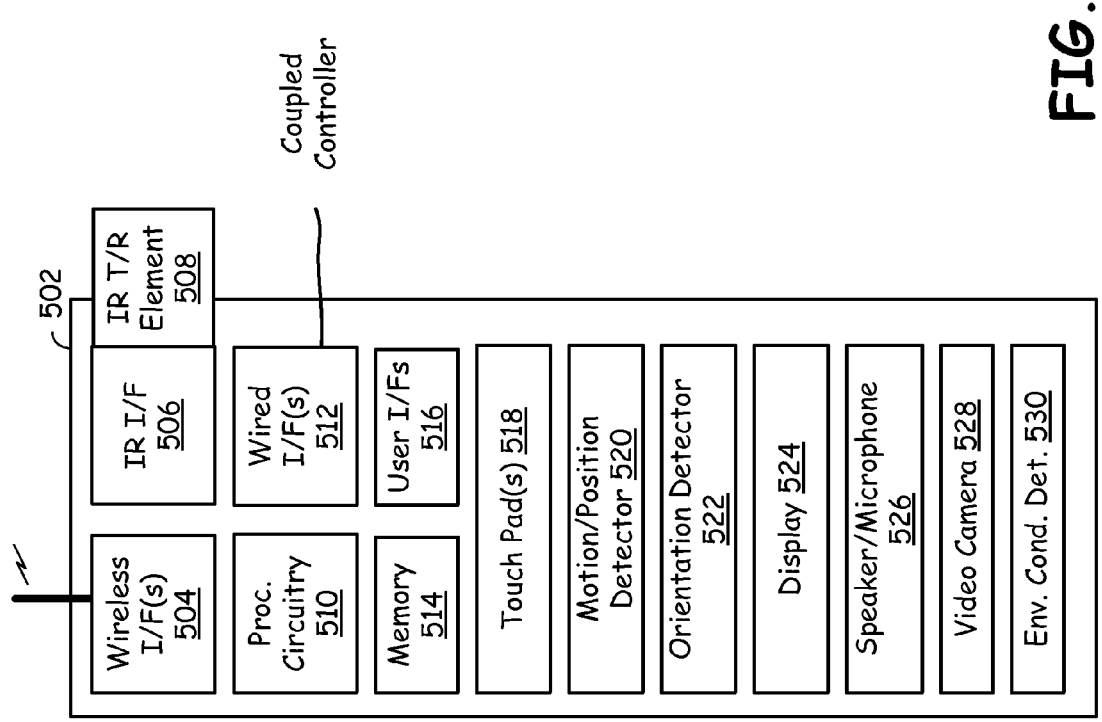
FIG. 5 is a block diagram illustrating a game controller constructed according to one or more embodiments of the present invention.

FIG. 5 is a block diagram illustrating a game controller constructed according to one or more embodiments of the present invention. The game controller 502 includes one or more wireless interfaces 504, an Infrared (IR) interface 506 that includes an IR transmit/receive element 508, processing circuitry 510, wired interface(s) 512, memory 514, and user interface(s) 516. These particular components of the game controller 502 may be similar to the like named components of the game console 302 illustrated in FIG. 3 and described with reference thereto. However, in other embodiments, these like named components may have differing construct/functionality, e.g., smaller memory, less processing capability, lower power wireless interfaces, etc. Thus, commonly named components will not be described further herein as they have been previously described with reference to FIG. 3.

The game controller 502 includes one or more touch pad(s) 518, motion/position detector 520, orientation detector 522, display 524, speaker/microphone 526, and a video camera 528. The game controller 502 may also include other components such as one or more environmental conditions detectors 530 that are used to sense environmental conditions such as temperature, humidity, and other environmental conditions. The structure and operations of the touch pads 518 will be described further herein with reference to subsequent FIGs. The motion/position detector 520 detects motion/acceleration/position of the game controller 502. Detection of such motion/acceleration/position may be performed in conjunction with the game controller, using a GPS system, using an accelerometer or gyrator of the game controller 502 and/or using external components to determine motion/acceleration position of the game controller. The motion/position detector 520 may also determine position of the game controller. The manner in which the motion/position detector 520 determines the position of the game controller 502 is not described further herein. However, the position detector 520 may use external reference devices in order to determine position of the game controller within a gaming environment. Motion, acceleration, and position of the game controller 502 may be provided to a servicing game console as gaming input.

The orientation detector 522 determines an orientation and/or direction in which the game controller is pointed. Such orientation detection provided by orientation detector 522 may be accomplished in conjunction with the IR interface 506 of the game controller 502. Such orientation detection may be performed in conjunction with the IR detector 106 of the gaming system 100 of FIG. 1.

The display 524 of the game controller 502 may have a relatively small size or relatively large size that presents information to a user and that allows the user to respond accordingly. The speaker/microphone 526 may receive audio input and provide audio output to a user of the game controller 502. Audio input captured by the microphone may be used in conjunction with touch pad 518 input for user identification and/or for gaming input. Video camera 528 of the game controller may be used to determine a location of the game controller and/or may be used to provide additional gaming input for gaming environments supported by the game controller 502.

According to one particular aspect of the gaming system of FIG. 1, the touch pad(s) 518 of the game controller 502 (and/or game console) may be capacitive, inductive, or RF based. With regard to input received via the touch pads of the game controller, the raw data (touch pad input) received by a touch pad of the game controller may be fully communicated to the game console of the gaming system. Alternatively, information captured via the touch pad(s) 518 of the game controller may be processed by the processing circuitry 510 of the game controller 502 (or other processing circuitry such as the touch pad circuitry shown in FIG. 6, which may be different or the same as the processing circuitry 510) prior to communicating such information to the game console 102 of FIG. 1. Such processing may be full or partial to determine whether to upload data and what data to upload to the game console.

Referring again to FIG. 4, the touch pad input received by game controller may be received at both primary 402 and secondary 404 game controllers of FIG. 4. The input received from multiple touch pads of the primary and secondary game controllers 402 and 404 may be received and at least partially processed by processing circuitry of the game controller(s) prior to uploading the data to a game console. The basis for touch pad input processing may be based upon a current usage of the game controllers. For example, the primary game controller 402 may be relevant to a first portion of a user's body while the secondary game controller 404 may be relevant to a second portion of a user's body. In one particular example, input device receives touch pad input corresponding to one or more feet of a user, e.g., secondary controller 404 is a foot pad. In such case, a foot pattern of a user may be employed to identify the user or to receive gaming input from the user within the gaming system.

The data received from one or more touch pads according to the present invention may be used to identify a user of the gaming system. Data captured by one or more touch pads or panels is used to distinguish a user from a plurality of users based upon finger width, finger length, finger spacing, knuckle joint location, finger angle, and other characteristics of a user's hand/fingers that is used to grasp the game controller. Identification of the user is done based upon pattern matching using various techniques, some of which are known. Further, the touch pads and related operations supported by the structures of the present invention may identify users based upon their heat transfer characteristics, their pulse rate characteristics, and other characteristics that would be gathered via input at a touch pad.

In establishing user characteristic/user ID correspondence, there may be multiple levels of training. With one level of training, a user sets-up his or her identity within the gaming system. Then, a first operation establishes correspondence between touch pad characteristics and the user. The gaming system may query a user to confirm that he or she is currently using the game controller with this operation by receiving input from a touch pad and then confirming that the particular user identity is correct. Further, the training may proceed so that it is initially intrusive and asks a number of questions of the user but then decreases its intrusions when matching stored users with touch pad input characteristics.

Alternatively, the game controller may simply automatically relate user characteristics as received from a touch pad with game characteristics or settings of the gaming system. Generally, the user identification learning process should be as automatic as possible so as not to be burdensome to users of the system. Further, the user identification system of the present invention should delete inactive users from the database so that they are not considered as candidates when determining whether or not a current user is one of a plurality of registered or prior users of a system.

According to another aspect of the present invention, the touch pad input that is used to identify the user may be used in conjunction with auxiliary information to identify a particular user. This auxiliary information may include game usage levels, game selections, time of day at which game is performed, day of week at which game is performed, gyrator input (accelerometer input), coupled secondary gaming devices or service devices, and/or additional auxiliary information. For example, one particular user may select generally games A, B and C while another user may select generally games C, D, and E. Based upon a particular game selection and data input received from a touch pad, the auxiliary information of game selection may be used to assist in identifying the user that is currently using the gaming system. Moreover, a particular user may only use the system during certain times of the day or days of the week and such information is further used to determine identity of the user of the gaming system. Some users may only use certain auxiliary devices such as nun chucks, guitars, drums, car driving accessories, plane control accessories, or other coupled devices of the game controllers. In such case, the operations of the present invention may use the fact that these devices are coupled to further limit the number of potential users that are considered for identification at a particular time.

Once a user is identified, a user ID is employed to enact a user's custom game data or settings for the gaming system. For example, a particular user is identified and this user's game selection, game settings, and other preferences that have been previously inputted into the game system are automatically enacted. According to another aspect of the present invention, once a user is identified, the gaming environment settings are altered based upon such identification. For example, once the user is identified, the game difficulty level, game entry point, game controller button functions, game controller touch sensitive panel/touch pad gaming input functions, and/or other custom settings of the gaming system may be altered. In one particular example, once a user is identified, a sequence of touches on the touch pad may alter some game operation or game selection operations. These particular custom operations are based upon the fact that a particular user is identified as currently operating the gaming system. Further, menus and other user input selections may be altered after a user is identified. For example, the user may have previously indicated that he or she only wants to use certain games. Once that user is identified the gaming system only gives that particular user the option of selecting from a list of previously selected games. Further, the user may have customized the menu of the gaming system previously and when the user is identified the customized user interface of the gaming system is enacted.

According to another aspect of the present invention, the touch pad is operable to determine a relative hand position of the user of the game controller. For example, some types of video games such as tennis or golf require that a user hold the game controller at a particular position. While other games require that the user holds the game controller at a differing position. According to one aspect of the present invention, the game controller and/or the game console is able to determine the position that the user is holding onto the game controller based upon touch pad input. Once this position is identified, the game controller/game console is able to limit the types of games that the user may play based upon the position of the hand with regard to the position of the controller. Thus, the game is customized to some degree based upon a hand position of the user with respect to the controller.

According to another aspect of the present invention, touch pad input received via touch pads or panels may be used for gaming input. For example, the touch pads may be used to determine that a user has changed his or her hand or finger positions, changed his or her grip positions or otherwise abruptly changed an input to a game controller that is used within a gaming system. Such detection may be used with one scanning rate of the touch pad. Alternatively, the scanning rate of the touch pad may be altered based upon a game being played. For example, when the game being played is one that has minimal input requirements, the scanning rate may be relatively lower. However, when a game is being played that has a relatively higher input rate such as a fitness program, the scanning rate of one or more touch pads of one or more game controllers may be increased. Further, scanning of one or more of the touch pads may be enabled for some portions of the game while not enabled for another portion of the game. For example, grip/finger position movement or pressure changes may be enabled during a first portion of the game and not enabled for other portions of the game. Such is the case because the particular gaming input that is being sensed by changing finger position or grip pressure is only relevant during some portions of the game and not others.

The gaming input may be based upon a change from a prior hand position or a prior relationship between the hand and the game controller and a current position of the hand with respect to the game controller. For example also, a baseline position for the hand with respect to the game controller may be established during a baseline mode of operation. Then, any alteration of the position of the hand with respect to the game controller will serve as a differing gaming input while operation of the game progresses.

Further, each of a plurality of touch sensitive pads of the game controller may be reconfigured by the game console based upon a game being played. Because each game being played may have particular gaming input requirements, the configuration of the touch pad may be required to be customized for the particular game being played so that the gaming input is most relevant to the particular game. For example, a game in which the touch pad provides multiple types of input to the game may require a configuration of the touch pad other than when the game controller touch pad only indicates whether or not the user has picked up the game controller. Further, configuration of the touch pads may be selected by user based upon the gaming parameters. For example, the configuration of the gaming panels may change a particular game point based upon a selection of the user.

Moreover, configuration of touch pad functions may be based upon the orientation of a controller. For example, when a golf, baseball, tennis or sword input is selected, the touch pad functions may differ for each of the particular types of games. Such is the case because the game controller may be held in different relative positions with respect to the hands for each of these types of games. Thus, the manner in which the touch pads provide gaming input will change based upon not only orientation of the controller but with regard to its simulated game piece function.

Further, each game may have its own particular touch input language that implements particular game function(s). Such game touch input language may be considered as a sequence of touches with the touches in particular portions of the touch pad providing input to the game. The sequence of touches provided to the touch pad is similar to those that may be provided via sequence of button selections via mechanical buttons of the prior game controller. However, because the touch pad of the present invention game controller is very configurable and not limited by mechanical button limitations, the touch pad may be configured at different points in time to have particular touch sequence input functions.

FIG. 6 is a block diagram illustrating a touch sensitive pad and touch pad circuitry constructed according to one or more embodiments of the present invention. A touch pad 602 includes a plurality of touch sensitive elements 604 each of which corresponds to a particular location of the touch pad 602. With the embodiment of FIG. 6, the touch pad includes an array of touch sensitive elements 604, each of which may be a particular capacitively coupled location, inductively coupled location, or a radio frequency (RF) touch sensitive element. Touch pad circuitry 606 couples via a grid structure to the plurality of touch sensitive elements 604 to sense the particular capacitance, inductive, or RF characteristics at each of the touch sensitive elements.

Touch pad circuitry 606 scans the plurality of touch sensitive elements 604 via access of particular row-column combinations at particular times. The frequency or voltage at which the touch pad circuitry 606 scans the plurality of touch sensitive elements 604 may be altered over time. Choosing the scanning frequency or scanning voltage may be based upon a particular operational use of the touch pad. For example, at some points in time the manner in which the touch pad is scanned will change based upon a particular point in a game of a gaming system with which the touch pad functions as a gaming input device. Further, a first scanning frequency/scanning voltage may be employed for user identification while a second scanning frequency/scanning voltage may be employed for gaming input functions.

The scanning done by the touch pad circuitry 606 of the plurality of touch sensitive elements 604 may be made using a spread spectrum frequency scanning technique. Such technique may be employed to more efficiently capture information from the touch pad 602 at the various touch sensitive elements 604 or to determine which particular scanning frequencies are more successful than others in capturing input information.

Further, the scanning of each row and column corresponding to a particular touch sensitive element 604 may be altered based upon a detected capacitance (inductance/RF propagation) at the location. For example, one particular touch sensitive element 604 may have a fixed capacitance that does not vary over time. Such fixed capacitance may indicate that the particular touch sensitive element 604 is inoperable or that it receives no discernible input. In such case, by not scanning the particular touch sensitive element, other touch sensitive elements may be more frequently scanned or energy may be saved by not scanning all touch sensitive elements.

According to another aspect of the present invention, some portions of the touch pad may be disabled while others are enabled at differing points in time. Enablement of some touch sensitive elements and not others may be based upon a custom configuration of the touch pad for a particular input function provided.

The touch pad 602 may also be calibrated by the touch pad circuitry 606 based upon the environmental factors such as temperature, humidity, and surrounding noise from the capacitance, inductance, or RF perspective. Calibration of the touch pad 602 allows the touch pad 602 to have more efficient and effective touch pad input for user identification and/or for other input purposes.

The touch pad 602 may also be calibrated by the touch pad circuitry 606 based upon the environmental factors such as temperature, humidity, and surrounding noise as detected by measured capacitance, inductance, or RF propagation characteristics. Calibration of the touch pad 602 allows the touch pad 602 to be more efficient and more effectively receive touch pad input for user identification and/or for other input purposes. The calibration of the touch pad 602 by the touch pad circuitry 606 may be initiated at particular points in time. The touch pad circuitry 606 may simply initiate calibration of the touch pad 602 upon the expiration of a timer such that the touch pad is calibrated at a particular regular time interval. Alternatively, the touch pad 602 may be calibrated after a period of inactivity, i.e., the touch pad circuitry 606 performs calibration when it determines that no input is present on the touch pad 602. With other operations or embodiments, the touch pad 602 may be calibrated by the touch pad circuitry 606 using other input criteria as well.

Figure 7B:
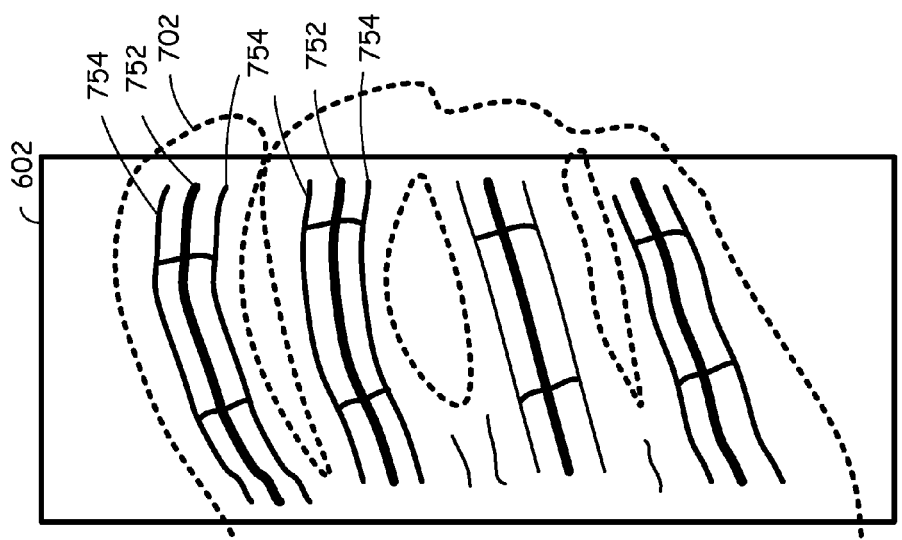
FIG. 7B is a diagram illustrating the manner in which a user's hand upon the touch sensitive pad may produce a particular pattern of capacitance upon the touch sensitive pad.
Figure 7A:
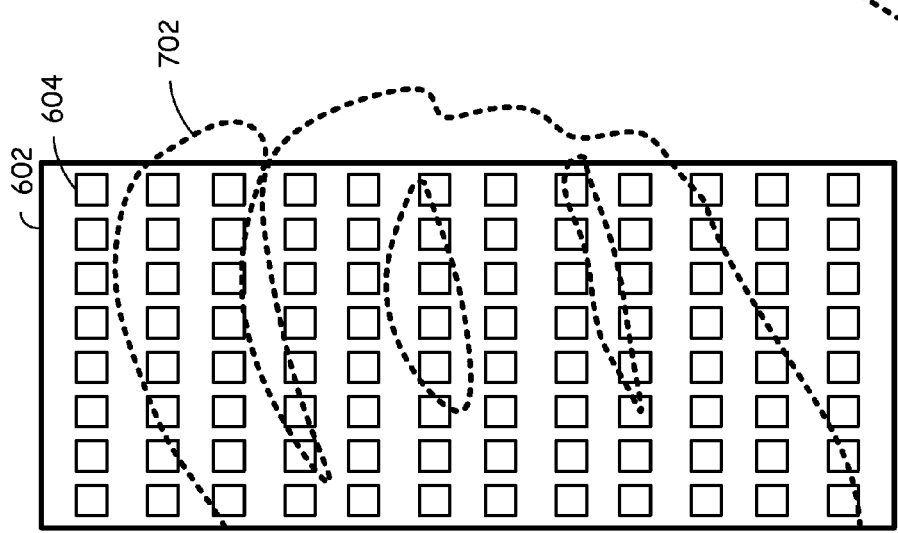
FIG. 7A is a diagram illustrating how a user's hand may overlay a touch sensitive pad according to one or more embodiments of the present invention.

FIG. 7A is a diagram illustrating how a user's hand may overlay a touch pad according to one or more embodiments of the present invention. The touch pad 602 has a plurality of touch sensitive elements 604 and is mounted upon a portion of a vehicle so that it is adjacent a user's hand when the user holds the portion of the vehicle. The outline 702 of users hand is shown as overlaying the touch pad 602 and the plurality of touch sensitive elements 604. While the touch pad 602 of FIG. 7A is generally illustrated as planar, the touch pad 602 may wrap around a steering wheel, gear shifter, door handle, or another vehicle component.

FIG. 7B is a diagram illustrating the manner in which a user's hand upon the touch pad produces a particular pattern of capacitance (inductance/RF propagation) upon the touch pad. A relative capacitance, inductance, or RF propagation pattern of the user's hand 702 is shown on touch pad 602. The depiction in FIG. 7B is illustrated in general only of relative capacitance at each of the user's finger location positions upon the touch pad 602. For example, where the user's fingers touch physically the touch pad 602, stronger capacitance lines 752 and 754 are shown. Where the user's fingers overlay the touch pad 602, lesser capacitance, inductance, or RF propagation characteristic lines 754 are shown. While other capacitance lines on the touch pad 602 are not shown in FIG. 7B are numbered, the various capacitance lines would be present for the other fingers as well.

The capacitance pattern of the user's hand 702 upon the touch pad 602 is a signature of a particular user. The size of user's hands, the positions of their knuckles, the relative angle at which they grip the location in the vehicle. Thus, based upon this variation of the capacitive pattern upon the touch screen 602, differing users can be identified. Further, considering that the touch pad 602 may serve as an input device, the capacitance of the touch sensitive elements 604 of the touch pad of 602 over time as it varies may be used to indicate touch pad input. Based upon the scanning frequency, the scanning voltage, and other scanning factors of the touch pad 602 at the various touch sensitive elements 604, the characteristics measured at each touch sensitive element 604 over time will enable the device to identify a user or to try particular input via the touch pad 602.

The apparatus of FIGS. 1-6 can singularly or jointly perform the operations of the following FIGS. 8-31. With some of these FIGs. processing performed is not identified as being performed by a particular device. In such case the processing may be performed by one or both of a game controller and/or a game console. In other operations the processing or operations performed are attributed to one of a game console or game controller. In such cases, the processing could alternatively be performed by the other of the game console or game controller or jointly by the game console and game controller. Further, the operations of FIGS. 8-31 may be performed by an all-in-one gaming system.

FIG. 8 is a flowchart illustrating operations 800 of a game controller and a game console to receive and process touch pad input according to one or more embodiments of the present invention. In FIG. 8, operations 800 begin when touch pad input is received from at least one touch sensitive pad of a game controller, step 802. As previously shown, the at least one touch sensitive pad of a game controller has a plurality of touch sensitive elements. Each of these touch sensitive elements is individually scanned to detect capacitance, inductance, or RF propagation characteristics of the touch sensitive element.

The touch pad input corresponds to a user's touch of at least some of the plurality of touch sensitive elements. The touch pad input is processed by processing circuitry of the game controller, step 804. The game controller may perform first processing operations on the touch pad input and transmit the touch pad input to the game console for second processing operations such that processing operations on the touch pad input are shared between the game controller and the game console. Alternately the game controller may simply transmit raw touch pad input to the game console for processing. In still other operations, all processing of the touch pad input is performed by the game controller.

The at least partially processed touch pad input is transmitted to the game console via a communications interface of the game controller, step 806. The game console processes the touch pad input for user identification, gaming input, game operation alterations (e.g. power down game, pause game, game settings, and the like), step 808. The game console may then direct the game controller to alter its operations at step 810, including altering operations of the touch sensitive pad.

Generally, the manner with which touch pad input is used to identify users is described with reference to FIGS. 11-17, the manner with which touch pad input is used as gaming input is described with reference to FIGS. 18-21, the manner with which touch pad input is used to configure gaming operations is described with reference to FIGS. 22-26B, and the manner in which configuration/operation of the touch pad is performed is described with reference to FIGS. 27-31. Of course, these various operations may be combined in many different ways and still practice teachings of the present invention.

FIG. 9 is a flowchart illustrating other operations 900 of a game controller and a game console to receive and process touch pad input according to one or more embodiments of the present invention. Operations 900 begin with first touch pad input received from a first touch sensitive pad of a game controller, step 902. First touch pad input is received via a first touch pad that has a first plurality of touch sensitive elements. Second touch pad input is then received from a second touch pad of the game controller or from a touch pad of a second game controller that communicatively couples to the first game controller, step 904. The second touch pad input is separate and distinct from the first touch pad input. The first and second touch pad inputs are processed and/or combined to produce combined touch pad input, step 906.

The first touch pad input may be user finger touch pad input, user thumb touch pad input, user hand touch pad input, or a combination of these. The user finger touch pad input can be combined with the user thumb touch pad input to produce combined user touch pad input. Further, the first touch pad input may be captured by a touch pad of the first game controller and the second touch pad input may be captured by a touch pad of the second game controller and combined to produce the combined touch pad input. In such case, the first touch pad input may be from a first hand of a user and the second touch pad input may be from a second hand of the user (or from the hand of another user). Alternately, the first touch pad input may be of a hand of the user and the second touch pad input may be of a foot of the user. Of course, the teachings of the present invention apply to other combinations of input(s) as well.

The combined touch pad input is transmitted to the game console via a communications interface of the game controller, step 908. The game console then uses the touch pad input for user identification, gaming input, game operation alterations (e.g. power down game, pause game, game setting, and the like), step 910. The game console may direct the game controller to alter operations of at least one touch sensitive pad, step 912.

In one embodiment, initial operational parameters are set for the least one touch sensitive pad of the game controller by either the game controller or the game console. Based upon further input received by the game controller, the operations of the touch sensitive pad are altered. These operations will be described further herein with reference to FIGS. 27-31. It is understood that the game console could make the decision to direct the game controller to alter operations of at least one touch sensitive pad, as will be described herein, even thought the game controller may make such operational decisions alone.

Figure 10:
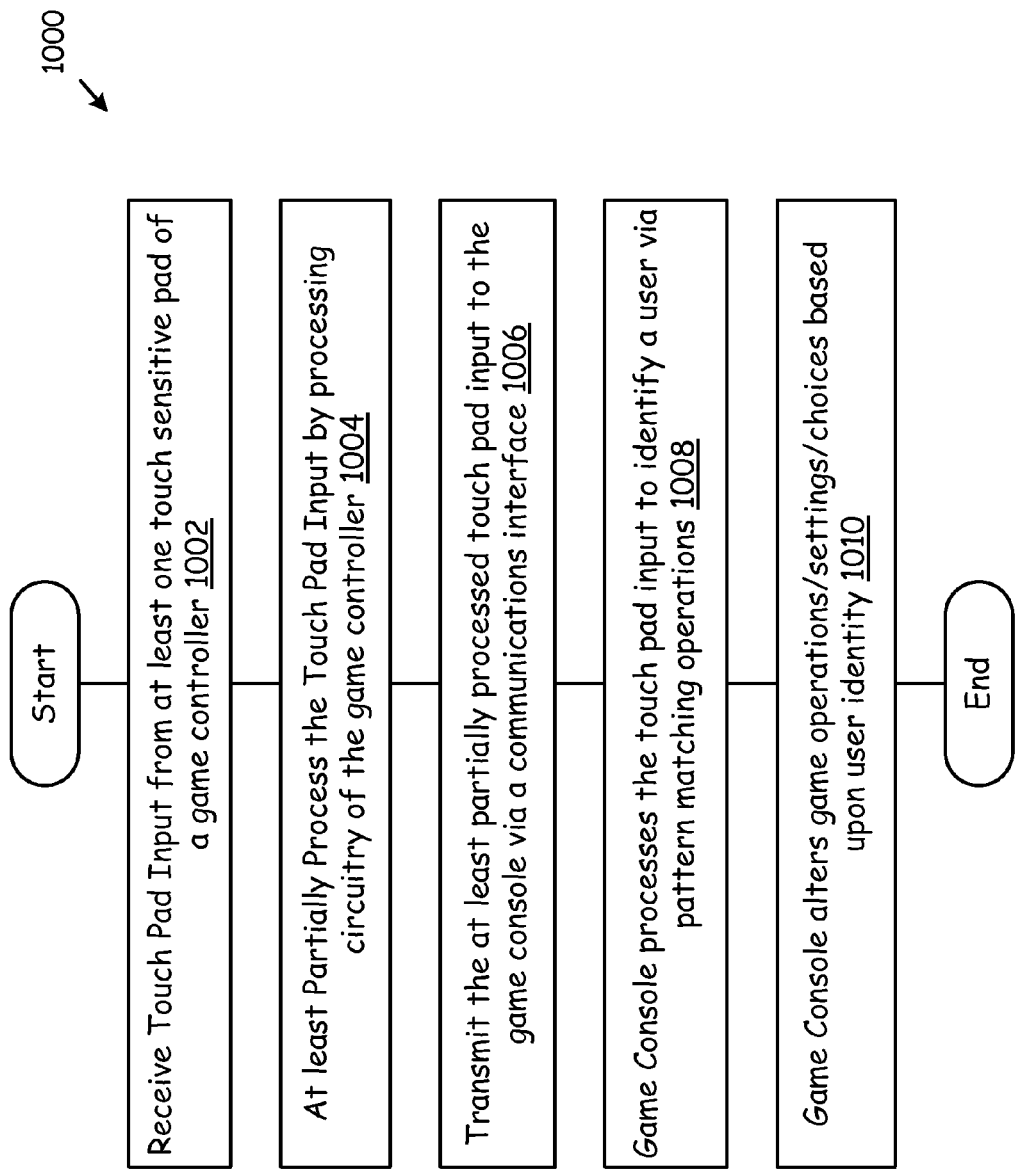
FIG. 10 is a flowchart illustrating operations of a game controller and a game console to identify a user using touch pad input according to one or more embodiments of the present invention.

FIG. 10 is a flowchart illustrating operations 1000 of a game controller and a game console to identify a user using touch pad input according to one or more embodiments of the present invention. Operations 1000 begin when touch pad input is received from at least one touch sensitive pad of a game controller, step 1002. The touch pad input has components from a plurality of touch sensitive elements of the touch pad of the game controller. The touch pad input is at least partially processed by processing circuitry of the game controller, step 1004. The at least partially processed touch pad input is then transmitted to the game console via a communications interface, step 1006. The game console processes the touch pad input to identify a user via pattern matching operations, step 1008. The game console may then alter game operations/settings/choices based upon user identity, step 1010.

In another embodiment, other touch pad input is received from at least one touch sensitive pad of a communicatively coupled secondary game controller. The game controller transmits the combined processed touch pad input for processing to identify the user via pattern recognition. The pattern recognition used at step 1008 may be based upon user finger characteristics, hand characteristics, foot characteristics, or a combination of these. These characteristics and processing employed to determine these characteristics are described further herein with reference to FIG. 12. In another embodiment, heat transfer characteristics of a user's fingers are also determined based upon touch pad input and the heat transfer characteristics can be used to assist in identifying a user. Pulse rate characteristics of a user's fingers can be determined based upon the touch pad input and can be used to assist in identifying a user. Motion data can be received from a motion detector of the game controller via the communications interface and can be used to assist in identifying a user. Voice data can be received from a microphone of the game controller via the communications interface and can be used to assist in identifying a user.

Figure 11:
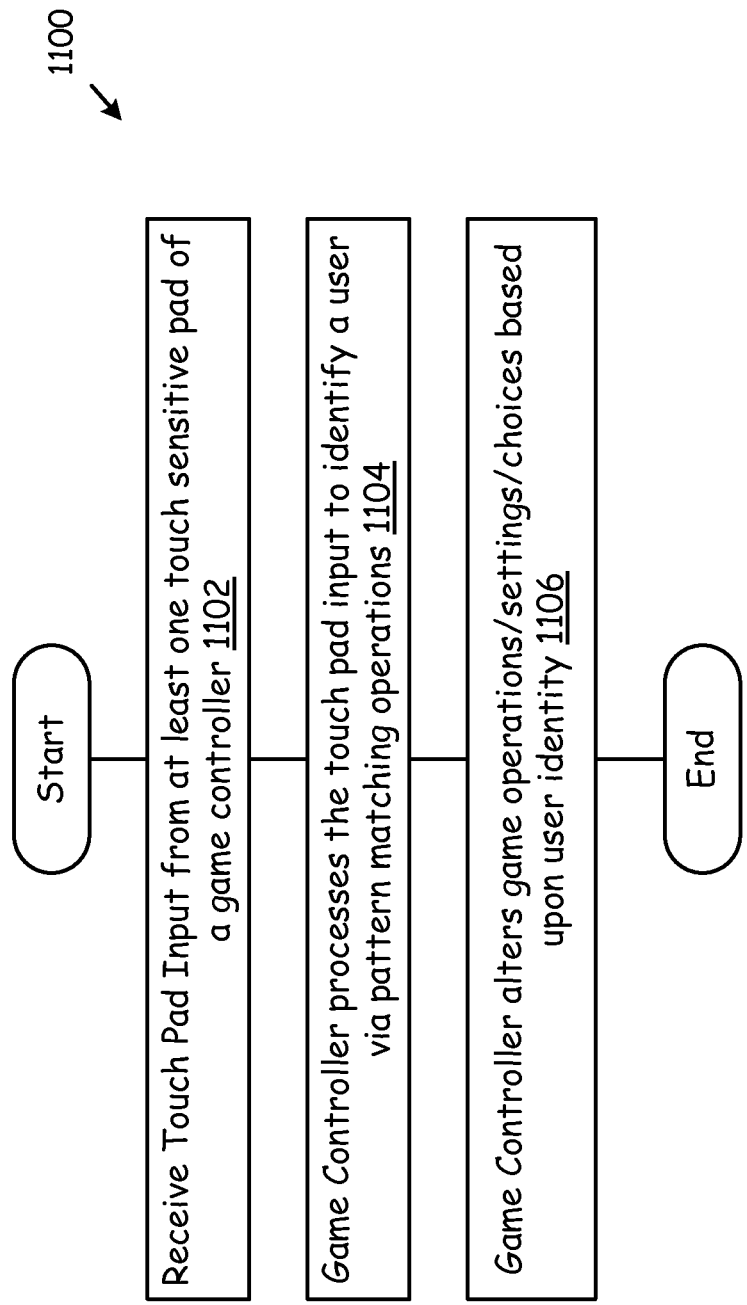
FIG. 11 is a flowchart illustrating operations of a game controller to identify a user using touch pad input and to alter game operations/settings/choices according to one or more embodiments of the present invention.

FIG. 11 is a flowchart illustrating operations 1100 of a game controller to identify a user using touch pad input and to alter game operations/settings/choices according to one or more embodiments of the present invention. Operations 1100 begin when touch pad input is received from at least one touch sensitive pad of a game controller, step 1102. The game controller processes the touch pad input to identify a user via pattern matching operations, step 1104. The game controller alters game operations/setting/choices based upon user identity, step 1106, and the process ends. In FIG. 11, all operations are performed by a single device that performs both game controller/game console operations, and is referred to in FIG. 11 as a game controller, although it could be referred to as a gaming system. The reader should understand that with the process described herein, various processes described may be fully performed by the game controller, fully performed by the game console, or may be performed by a combination of the game controller and game processor.

Figure 12:
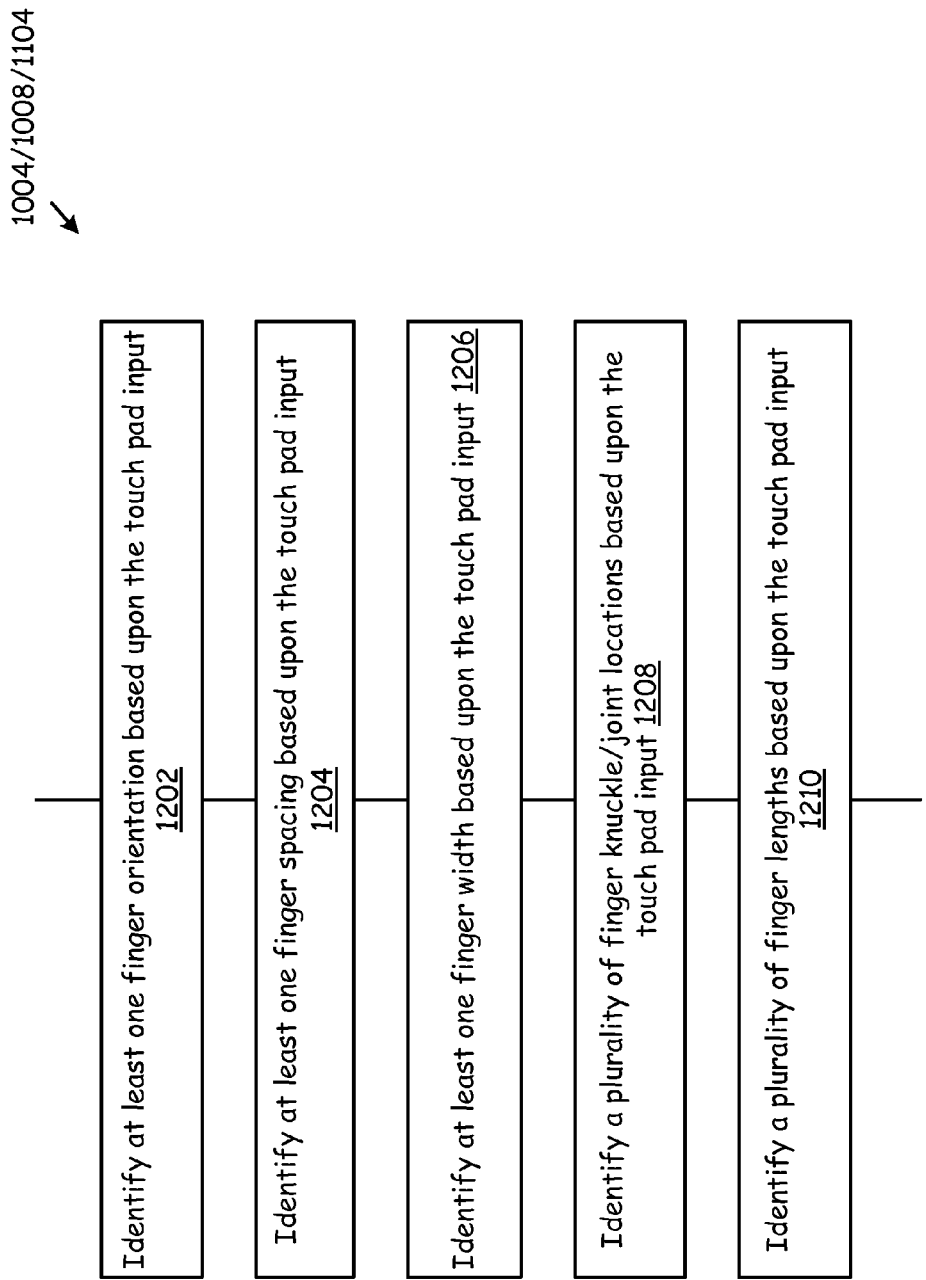
FIG. 12 is a flowchart illustrating at least partially processing touch pad input by processing circuitry of a game controller for use to identify a user based upon finger characteristics according to one or more embodiments of the present invention.

FIG. 12 is a flowchart illustrating at least partially processing touch pad input by processing circuitry of a game controller for use to identify a user based upon finger characteristics according to one or more embodiments of the present invention. The operations of FIG. 12 are performed in conjunction with steps 1004 and 1008 of FIG. 10, and step 1104 of FIG. 11. At least partially processing the touch pad input by processing circuitry of the game controller can be performed by one or more of the following: identifying at least one finger orientation based upon the touch pad input, step 1202; identifying at least one finger spacing based upon the touch pad input, step 1204; identifying at least one finger width based upon the touch pad input, step 1206; identifying a plurality of finger knuckle/joint locations based upon the touch pad input, step 1208; identifying a plurality of finger lengths based upon the touch pad input, step 1210.

User finger characteristics, e.g., at least one finger orientation, at least one finger spacing, at least one finger width, a plurality of finger knuckle/joint locations, and a plurality of finger lengths, may be determined by either or both of the game console and the game controller. The touch pad input can be processed by either/both the game console and the game controller to determine these characteristics. Once, determined, these characteristics are compared to stored data of the same type for user identification. At initial setup, these characteristics were stored for particular users.

Figure 13A:
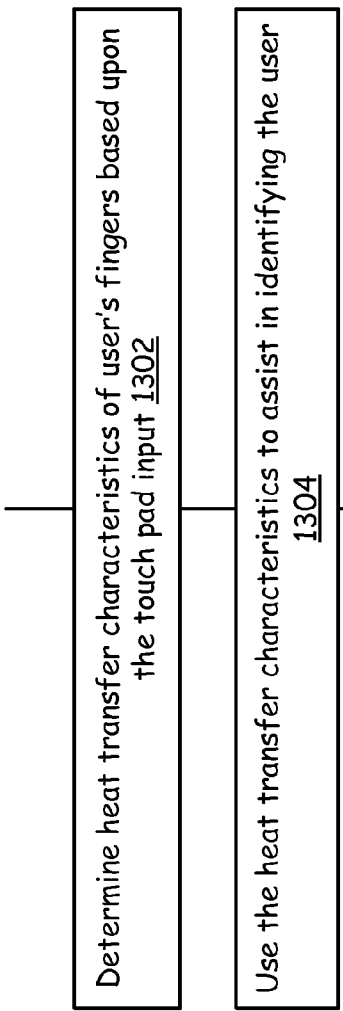
FIG. 13A is a flowchart illustrating at least partially processing touch pad input to determine heat transfer characteristics of a user's fingers based upon touch pad input according to one or more embodiments of the present invention.

FIG. 13A is a flowchart illustrating at least partially processing touch pad input to determine heat transfer characteristics of a user's fingers based upon touch pad input according to one or more embodiments of the present invention. The touch pad input is at least partially processed by processing circuitry of the game controller. Heat transfer characteristics of a user's fingers are determined based upon the touch pad input, step 1302. The heat transfer characteristics are used to assist in identifying the user, step 1304. These heat transfer characteristics can be used in conjunction with user finger/hand/foot characteristics to identify the user.

Figure 13B:
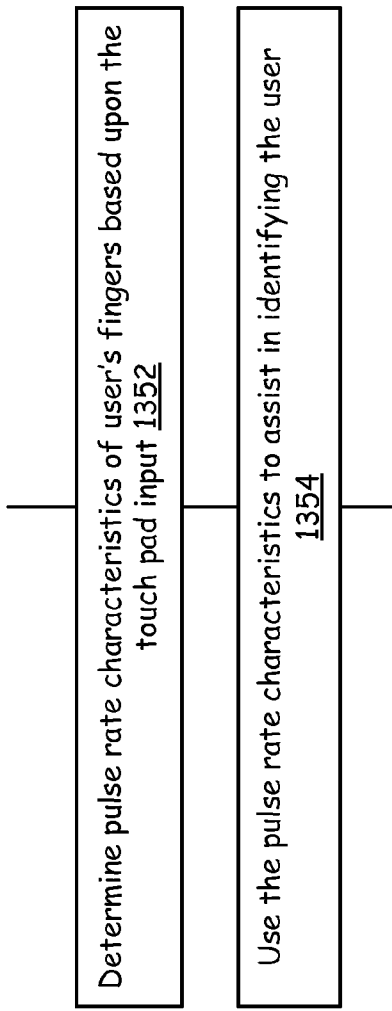
FIG. 13B is a flowchart illustrating at least partially processing touch pad input to determine pulse rate characteristics of a user's fingers based upon touch pad input according to one or more embodiments of the present invention.

FIG. 13B is a flowchart illustrating at least partially processing touch pad input to determine pulse rate characteristics of a user's fingers based upon touch pad input according to one or more embodiments of the present invention. The touch pad input is at least partially processed by processing circuitry of the game controller. Pulse rate characteristics of a user's fingers are determined based upon the touch pad input, step 1352. The pulse rate characteristics are used to assist in identifying the user, step 1354. These pulse rate characteristics can be used in conjunction with user finger/hand/foot characteristics to identify the user.

FIG. 14A is a flowchart illustrating the use of motion data to assist in identifying a user according to one or more embodiments of the present invention. Motion data is received from a motion detector of the game controller, step 1402. The motion detector may be an accelerometer or another component of the game controller that is capable of determining the motion of the game controller with respect to an inertial rest state, with respect to the immediate surroundings, with respect to the earth, or with respect to another reference frame. The motion data is transmitted to the game console via the communications interface of the game controller for processing to assist in identifying the user, step 1404. The motion data can be used in conjunction with user finger characteristics to identify the user.

FIG. 14B is a flowchart illustrating the use of voice data to assist in identifying a user according to one or more embodiments of the present invention. Voice data is received from a microphone of the game controller, step 1452. The voice data is transmitted to the game console via the communications interface of the game controller for processing to assist in identifying the user, step 1454. The voice data can be used in conjunction with user finger characteristics to identify the user. The voice data may be processed by the game controller prior to transmission to the game console. Alternately, the voice data may be captured by the game console and used by the game console to identify a user to augment other data used to identify the user, e.g., finger pattern, foot pattern, etc.

Figure 15:
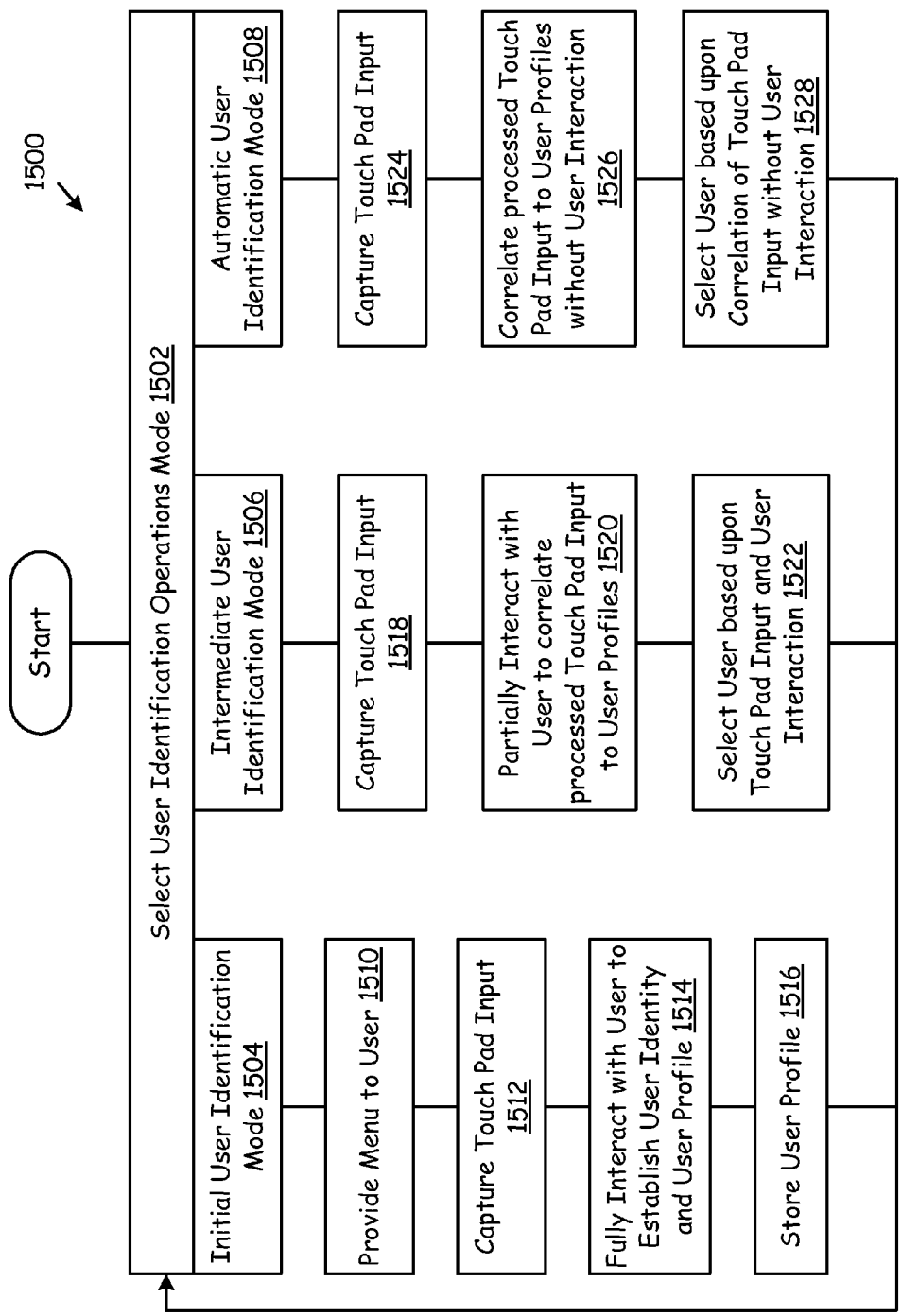
FIG. 15 is a flowchart illustrating multiple modes of user identification operations of a game controller and game console according to one or more embodiments of the present invention.

FIG. 15 is a flowchart illustrating multiple modes of user identification operations 1500 of a game controller and game console according to one or more embodiments of the present invention. Operations 1500 begin when a user identification operations mode is selected, step 1502. When selecting initial user identification mode, step 1504, a menu is provided to a user, step 1510. The menu allows the user to select a name and, optionally, other user profile data, such as age, weight, height, favorite games, etc. Touch pad input is then captured and processed to determine finger/foot/hand characteristics, step 1512. User identity and user preference profile/user preference data is established after fully interacting with the user, step 1514. The user profile is stored, step 1516, and the process returns to the step of user identification operations mode selection, step 1502. The user profile includes a user ID, user game preferences, user touch pad characteristics, e.g., finger characteristics, foot characteristics, heat transfer characteristics, pulse characteristics, motion characteristics, etc., and user preferences, e.g., game setting preferences, game preferences, etc.

When intermediate user identification mode is selected, step 1506, touch pad input is captured, step 1518. The system partially interacts with the user to correlate processed touch pad input to user profiles, step 1520. A user is selected based upon touch pad input and user interaction, step 1522. Such partial interaction may query the user to indicate that a correct user ID was selected based upon finger/hand/foot characteristics, for example. However, the extent of user interaction is much less than that of the initial user identification mode 1504.

When automatic user identification mode is selected, step 1508, touch pad input is captured, step 1524. The system correlates the processed touch pad input to user profiles without user interaction, step 1526. User is selected based upon only the touch pad input and user profiles, without additional user interaction, step 1528. Thus, with the operations beginning at step 1508 no user interaction is required.

Figure 16:
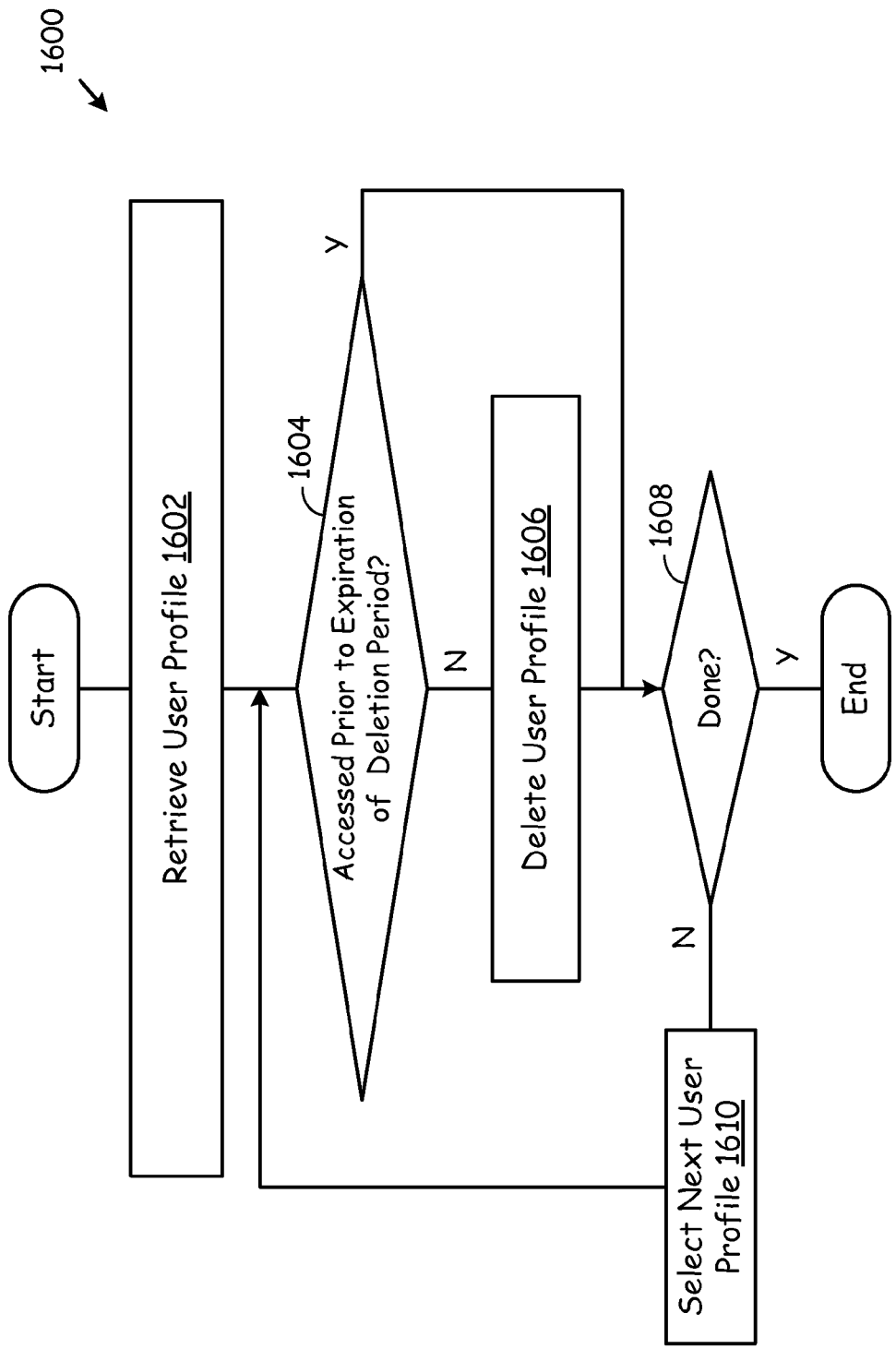
FIG. 16 is a flowchart illustrating the operation of a game controller and/or game console in deleting non-matched users after expiration of a user identification period according to one or more embodiments of the present invention.

FIG. 16 is a flowchart illustrating the operation of a vehicle control system in deleting non-matched users after expiration of a user identification period according to one or more embodiments of the present invention. Operations 1600 begin when a user profile is retrieved, step 1602. A determination is made regarding whether the user profile has been accessed prior to expiration of a deletion period, step 1604. If No is determined at step 1604, the user profile is deleted for the particular user, step 1606. If Yes at step 1604, the user profile has been accessed prior to expiration of deletion period and the user profile is not deleted. From both a Yes determination at step 1604 and after step 1606, a determination is made regarding whether the process is complete, step 1608. If a Yes determination is made at step 1608, the process ends. If No, the next user profile is selected, step 1610, and the process repeats to the determination step 1604.

Figure 17:
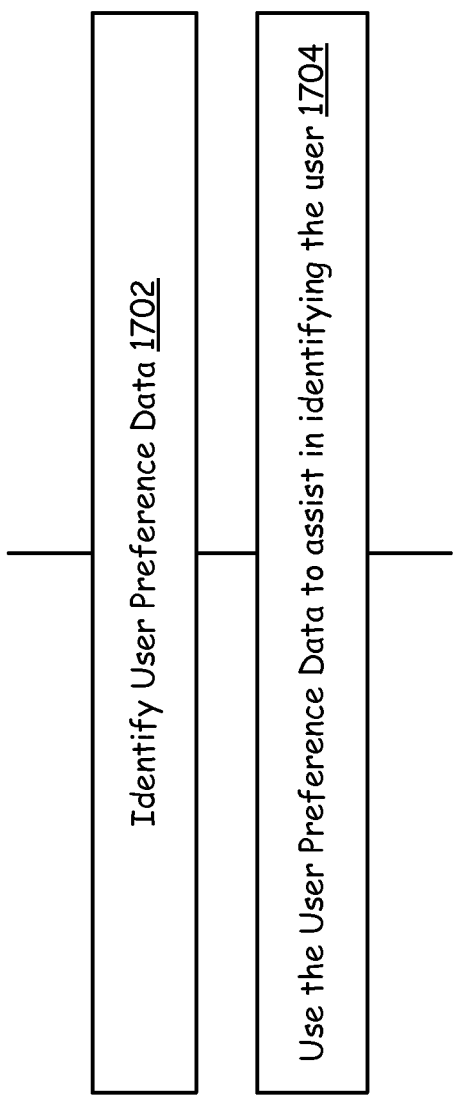
FIG. 17 is a flowchart illustrating the use of user preference data to assist in identifying a user by a gaming system according to one or more embodiments of the present invention.

FIG. 17 is a flowchart illustrating the use of user preference data to assist in identifying a user by a gaming system according to one or more embodiments of the present invention. User preference data is identified at step 1702. The user preference data includes game selection preferences, game setting preferences, time of day, day of week, game play duration, game usage level, and auxiliary game controller selection. The user preference data is used to assist in identifying the user by comparing current game operations and/or other pertinent information to the user preference data, step 1704. For example, for one particular video game, only one or two particular users may be common users for the currently loaded video game. Thus, at step 1704, only those two users may be prime candidates for pattern matching of finger/hand characteristics. As another example, some users may be common active during particular hours of the day and these users are favored for pattern matching during those hours of the day.

Figure 18:
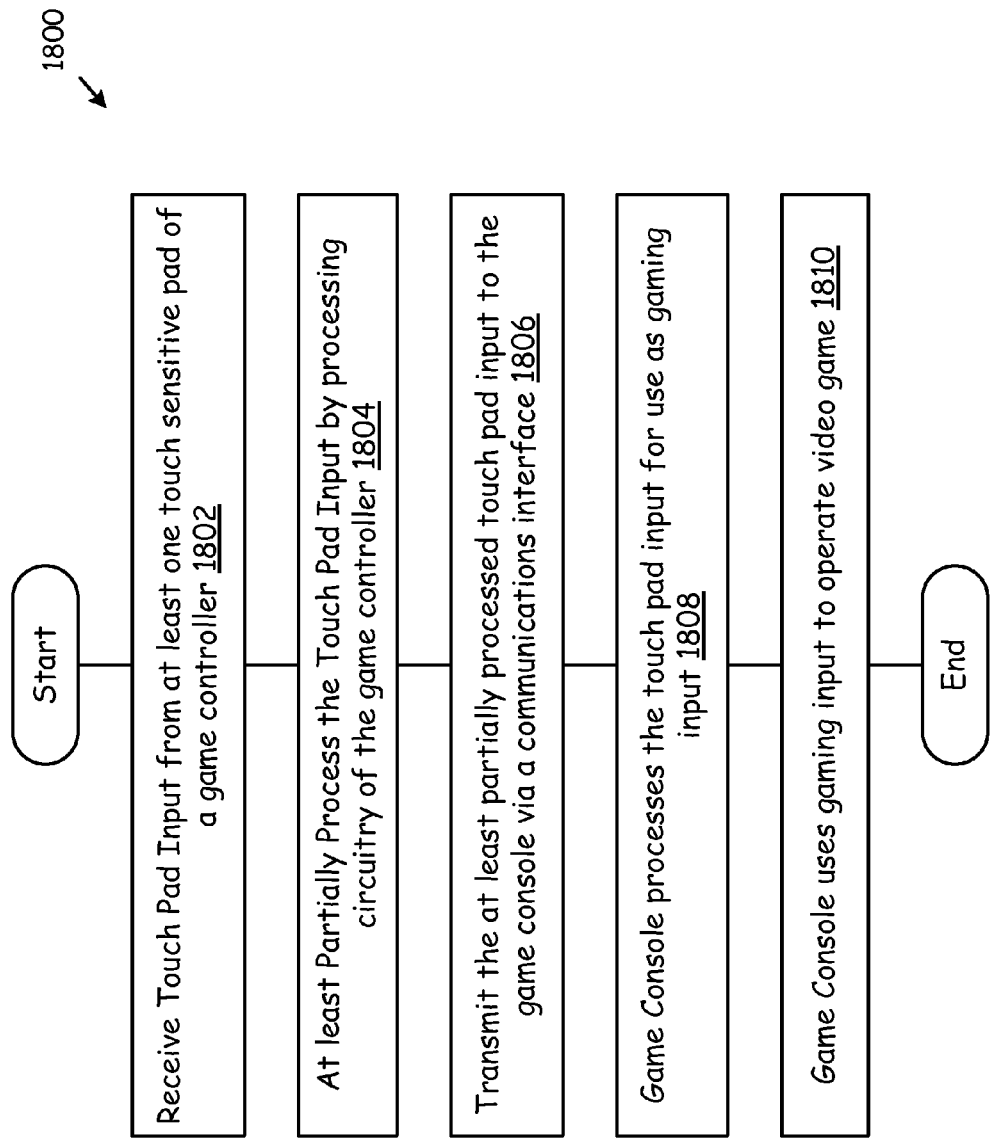
FIG. 18 is a flowchart illustrating the operation of a game controller and game console to use touch pad input as gaming input according to one or more embodiments of the present invention.

FIG. 18 is a flowchart illustrating the operation 1800 of a game controller and game console to use touch pad input as gaming input according to one or more embodiments of the present invention. Operation 1800 begins when touch pad input is received from at least one touch sensitive pad of a game controller, the touch sensitive pad having a plurality of touch sensitive elements, step 1802. The touch pad input corresponds to the user's touch of at least some of the plurality of touch sensitive elements. The touch pad input is at least partially processed by processing circuitry of the game controller, step 1804. The at least partially processed touch pad input is transmitted to the game console via a communications interface, step 1806. The game console processes the touch pad input for use as gaming input, step 1808. The game console uses gaming input to operate video game, step 1810.

The touch pad input is based upon a user's touch. The user's touch may be hand touch, finger touch, thumb touch, foot touch, stylus touch, or another touch of a user. Processing touch pad input for use as gaming input can be done by determining hand/foot position, including finger and/or thumb position, changes in hand/foot position, hand grip/foot pressure, changes in hand grip/foot pressure based upon the touch pad input, or from other user touches. Processing the touch pad input for use as gaming input may be by determining a sequence of user touches based upon the touch pad input. The sequence of user touches can be determined based upon user touches of differing portions of the touch sensitive pad. A baseline hand/foot position can be established based on touch pad input. A current hand/foot position can be determined based upon touch pad input. The gaming input is based upon a difference between the current hand/foot position and baseline hand/foot position.

Other touch pad input can be received via the communications interface. The other touch pad input is from at least one touch sensitive pad of a secondary game controller. Both the touch pad input and the other touch pad input are processed to produce combined touch pad input that is subsequently used as gaming input. A configuration for the at least one touch sensitive pad is determined to receive gaming input based upon at least one of a game being played, at least one game parameter, and/or at least one user selection. The configuration of the at least one touch sensitive pad is transmitted to the game controller for use when the configuration is determined by the game console.

Figure 19:
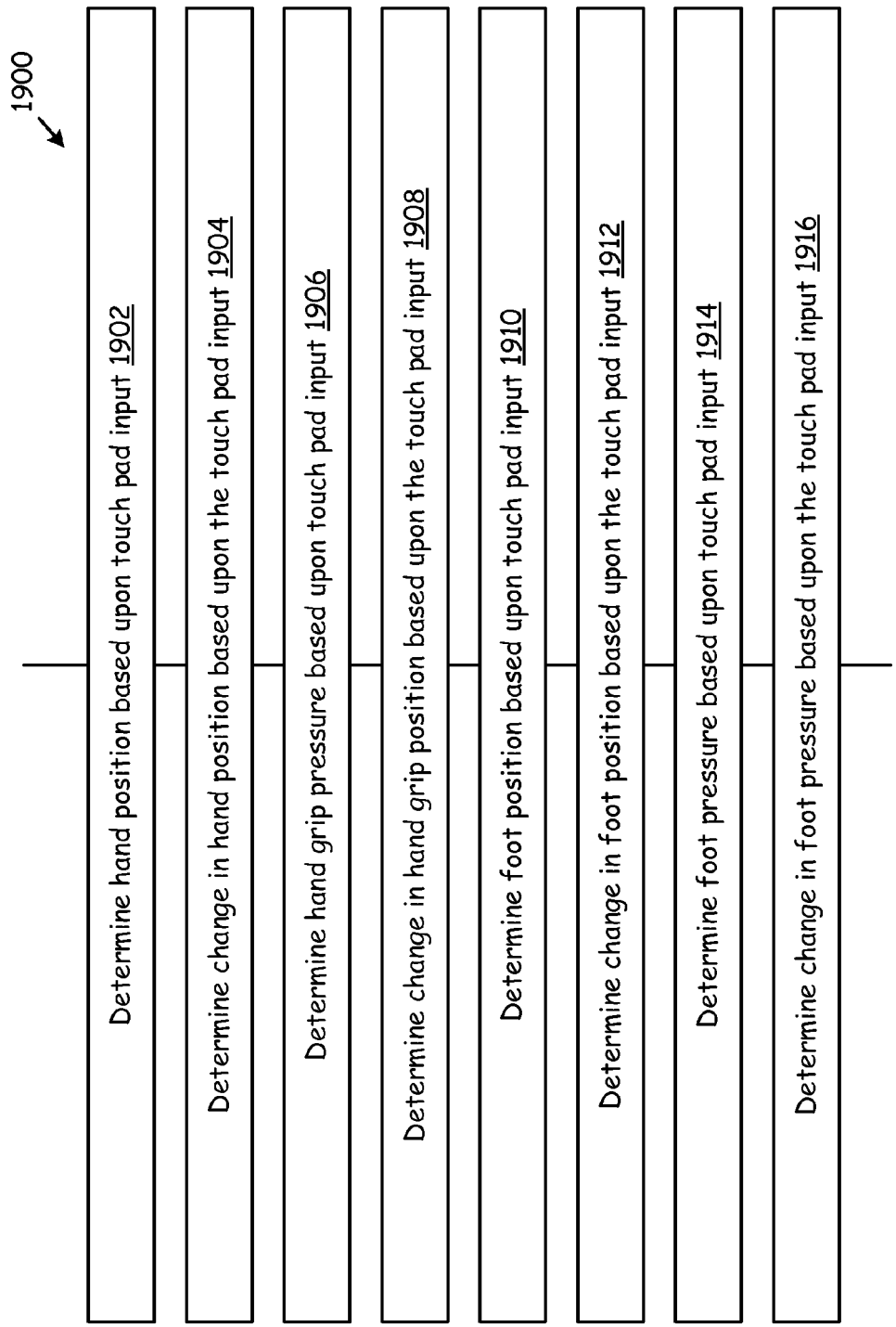
FIG. 19 is a flowchart illustrating at least partially processing touch pad input by a game controller or game console for gaming input use according to one or more embodiments of the present invention to determine gaming input.
Figure 20:
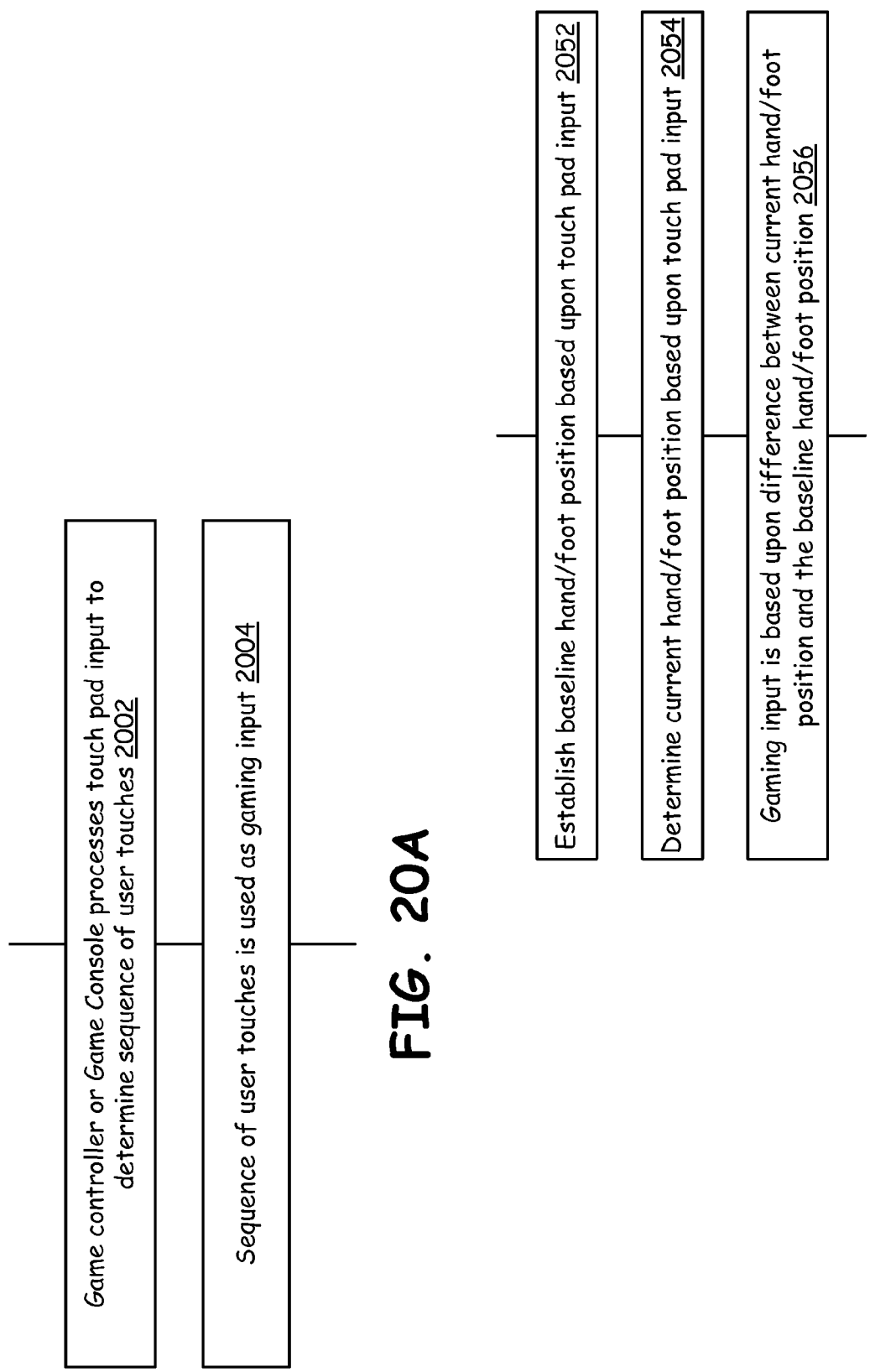
FIG. 20A is a flowchart illustrating the operation of a game controller or game console to receive a sequence of user touches as gaming input according to one or more embodiments of the present invention.
FIG. 20B is a flowchart illustrating the operation of a game controller or game console to determine gaming input using determined differences between a current hand/foot position and a baseline hand/foot position according to one or more embodiments of the present invention.

FIG. 19 is a flowchart illustrating at least partially processing touch pad input by a game controller or game console for gaming input according to one or more embodiments of the present invention to determine gaming input. The touch pad input is at least partially processed 1900 by processing circuitry of the game controller by one or more of the following: determining hand position based upon the touch pad input, step 1902; determining changes in hand position based upon the touch pad input, step 1904; determining hand grip pressure based upon the touch pad input, step 1906; determining changes to hand grip pressure based upon the touch pad input, step 1908; determining foot position based upon the touch pad input, step 1910; determining changes in foot position based upon the touch pad input, step 1912; determining foot pressure based upon the touch pad input, step 1914; and determining changes in foot pressure based upon the touch pad input, step 1916. It is understood that a change in finger position constitutes a change in hand position. Hand position is one or more of finger position and palm position.

FIG. 20A is a flowchart illustrating the operation of a game controller or game console to receive a sequence of user touches as gaming input according to one or more embodiments of the present invention. The touch pad input is at least partially processed by processing circuitry of the game controller to determine the sequence of user touches based upon the touch pad input, step 2002. The sequence of user touches is determined based upon user touches of differing portions of the touch sensitive pad. The sequence of user touches is used as gaming input, step 2004. For example, a particular sequence of touch inputs on particular portions of the touch pad may serve as a short-hand language input to cause the video game to perform particular operations. This short-hand language may be fixed or customized, depending upon the particular operation. Such short-hand language is analogous to shortcuts that may be employed with a keypad.

FIG. 20B is a flowchart illustrating the operation of a game controller or game console to determine gaming input using determined differences between a current hand/foot position and a baseline hand/foot position according to one or more embodiments of the present invention. A baseline hand/foot position is established based upon the touch pad input, step 2052. A current hand/foot position is determined based on the touch pad input, step 2054. The gaming input is based upon a difference between the current hand/foot position and the baseline hand/foot position, step 2056. Examples of such changes include changes in foot position as input to a snow board game, changes in hand position as input to a sword fight game, etc.

Figure 21:
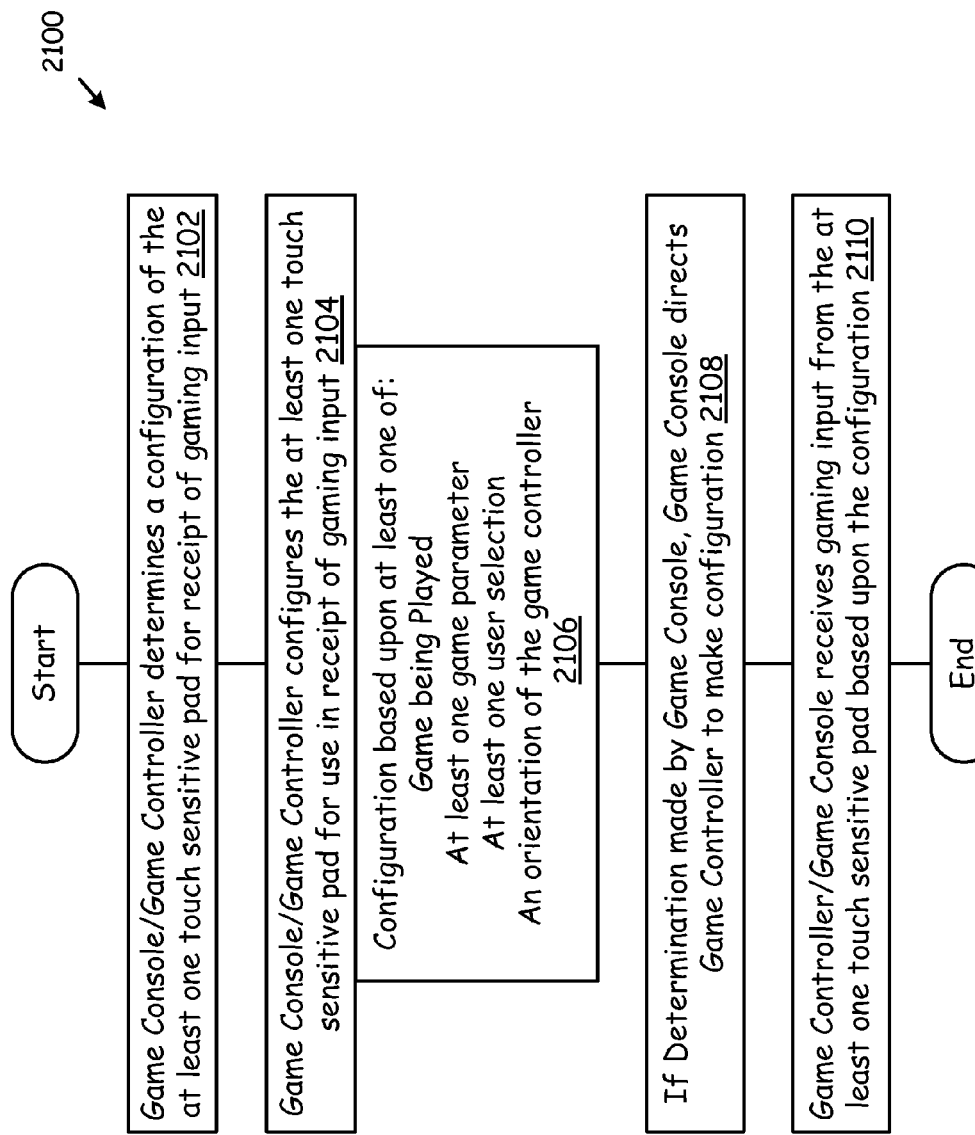
FIG. 21 is a flowchart illustrating operations of a game controller and/or game console to configure at least one touch sensitive pad for receipt of gaming input according to one or more embodiments of the present invention.

FIG. 21 is a flowchart illustrating operations 2100 of a game controller and/or game console to configure at least one touch sensitive pad for receipt of gaming input according to one or more embodiments of the present invention. Operations 2100 begin with a game console/game controller determining a configuration of the at least one touch sensitive pad for receipt of gaming input, step 2102. The game console/game controller then configures the at least one touch sensitive pad for use in receipt of gaming input, step 2104. The configuration is based upon at least one of the following: game being played; at least one game parameter; at least one user selection; an orientation of the game controller, step 2106. If the determination is made by the game console at step 2104, the game console directs the game controller to make the configuration, step 2108. Game controller/game console receives gaming input from the at least one touch sensitive pad based upon the configuration, step 2110, and the process ends.

Figure 22:
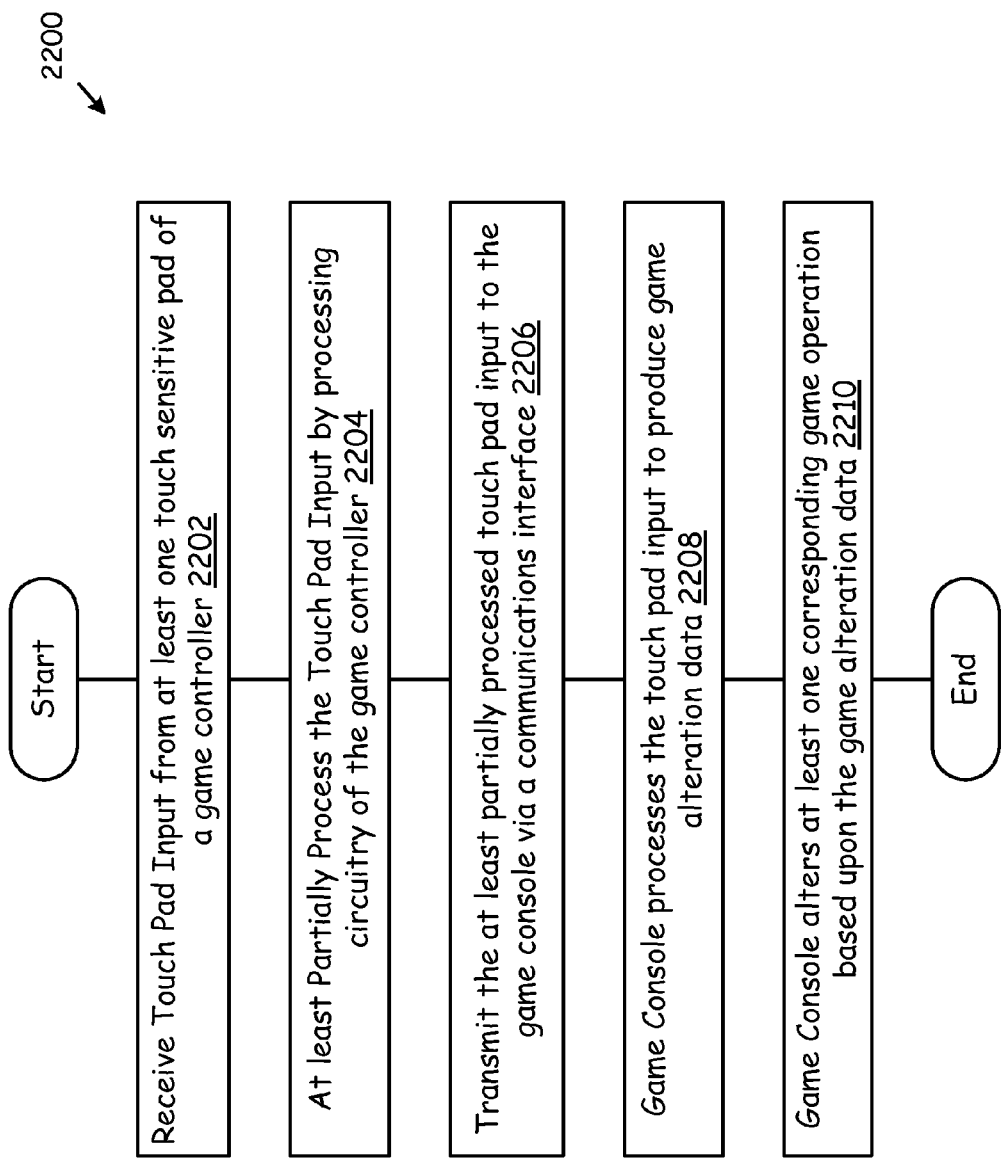
FIG. 22 is a flowchart illustrating the operation of a gaming system in altering video game operations according to one or more embodiments of the present invention.

FIG. 22 is a flowchart illustrating the operation 2200 of a gaming system in altering video game operations according to one or more embodiments of the present invention. Operations 2200 begin when touch pad input is received from at least one touch sensitive pad of a game controller, step 2202. The game controller has a plurality of touch sensitive elements. The touch pad input corresponds to a user's touch of at least some of the plurality of touch sensitive elements. The touch pad input is at least partially processed by processing circuitry of the game controller, step 2204. The at least partially processed touch pad input from the game controller is transmitted to the game console via communications interfaces of the game controller and the game console, step 2206. The game console processes the touch pad input to produce game alteration data, step 2208. At least one corresponding game operation is altered based upon the game alteration data, step 2210, and the process ends.

The operations in FIG. 22 could be performed by an all-in-one game controller/game console device. In such a case, the steps of transmitting the at least partially processed touch pad input to the game console via communications interfaces of the game controller and the game console (step 2206), processing by the game console the touch pad input to produce game alteration data (step 2208), and altering at least one corresponding game operation based upon the game alteration data (step 2210) are performed solely by the combined game controller/game console device.

Figure 23:
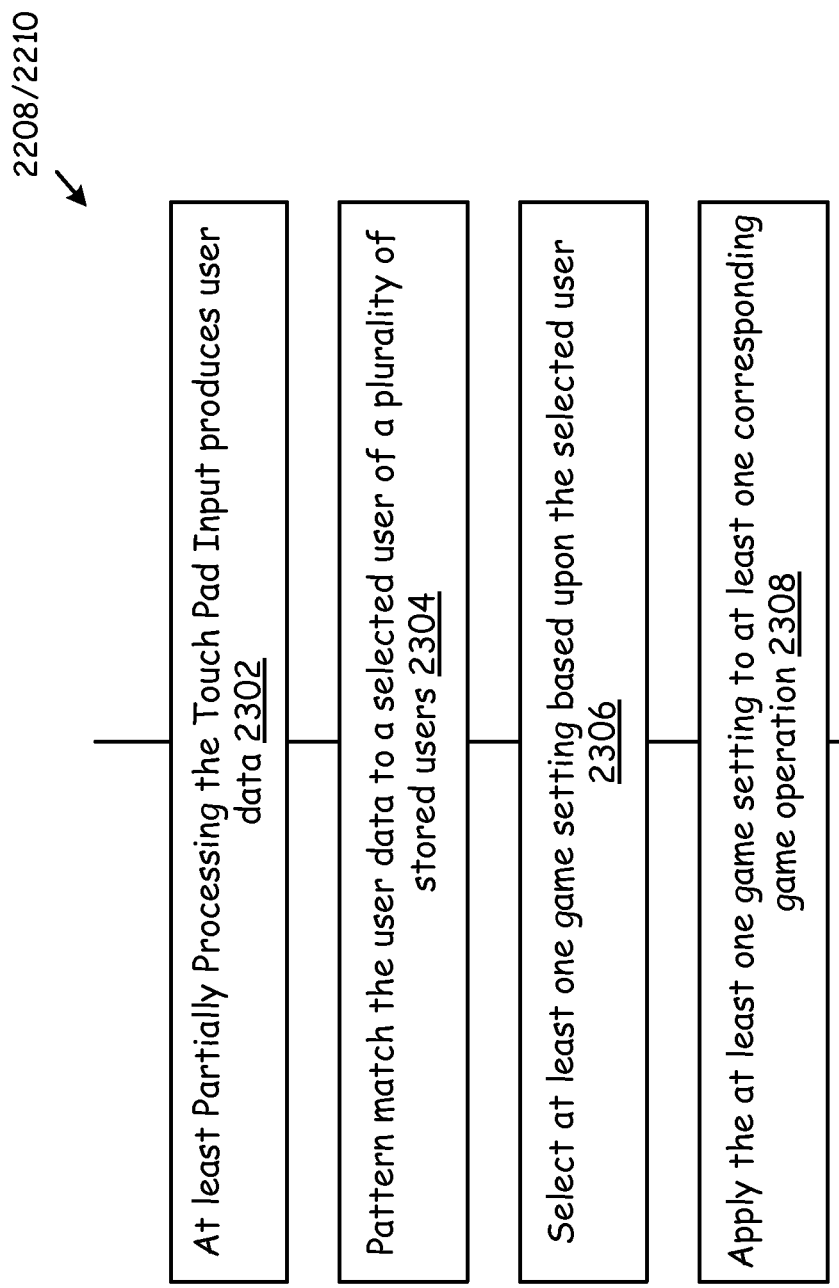
FIG. 23 is a flowchart illustrating the operation of a gaming system in applying at least one game setting to at least one corresponding game operation based upon user identification according to one or more embodiments of the present invention.

FIG. 23 is a flowchart illustrating the operation of a gaming system in applying at least one game setting to at least one corresponding game operation based upon user identification according to one or more embodiments of the present invention. The operations of FIG. 23 are performed in conjunction with steps 2208 and 2210 of FIG. 22. The game console processes the partially processed touch pad input to produce game alteration data. The at least partially processed touch pad input is processed to produce user data, step 2302. Pattern matching is used to match the user data to a selected user of a plurality of stored users, step 2304. At least one corresponding game operation is altered based upon the game alteration data. At least one game setting is selected based upon the selected user, step 2306. The at least one game setting is applied to at least one corresponding game operation, step 2308.

Figure 24:
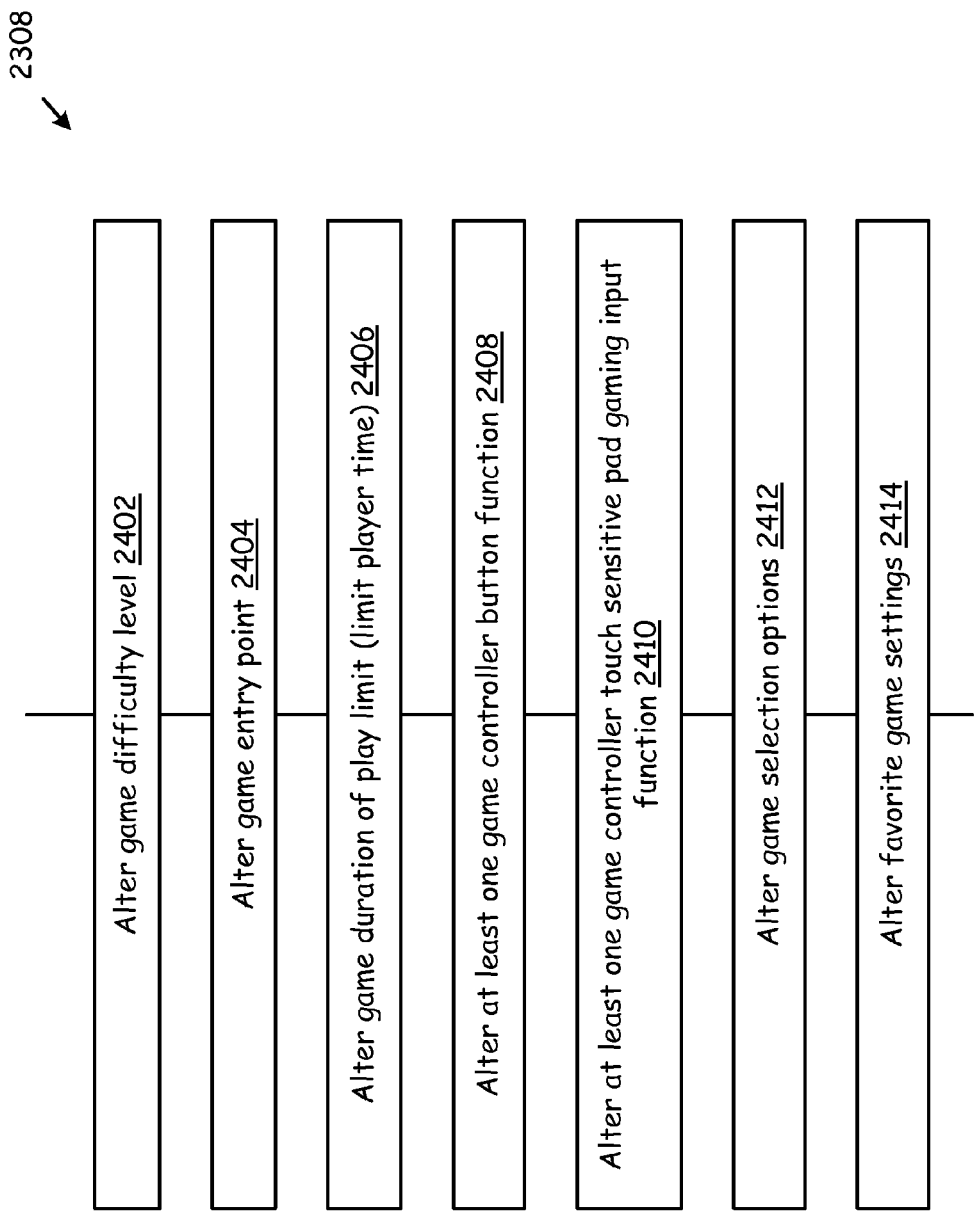
FIG. 24 is a flowchart illustrating the alteration of video game operations based upon at least one game setting according to one or more embodiments of the present invention.

FIG. 24 is a flowchart illustrating the alteration of video game operations based upon at least one game setting according to one or more embodiments of the present invention. The operations of FIG. 24 are performed in conjunction with step 2308 of FIG. 23. At least one game setting is applied to the at least one corresponding game operation, such as altering game difficulty, step 2402; altering game entry point, step 2404; altering game duration of play limit (i.e., limit player time), step 2406; altering at least one game controller button function, step 2408; altering at least one game controller touch sensitive pad gaming input function, step 2410; altering game selection options, step 2412; and altering favorite game settings, step 2414. Alteration of game selection options can include parental controls based upon the size of the hand/length of fingers of the hand that is handling the controller.

FIG. 25 is a flowchart illustrating altering at least one game operation based upon a determined game controller use according to one or more embodiments of the present invention. The operations of FIG. 25 are performed in conjunction with steps 2208 and 2210 of FIG. 22. The game console processes the partially processed touch pad input to produce game alteration data. The at least partially processed touch pad input is processed to produce a hand grip position characterization, step 2502. Pattern matching is used to match the hand grip position characterization to a selected game controller use of a plurality of stored game controller uses, step 2504. At least one corresponding game operation is altered based upon the selected game controller use, step 2506. Selected game controller use is one or more of gaming piece selection and game availability list, step 2508. A gaming piece could include such attachments as sword, tennis racquet, baseball bat, golf club, and the like. The game availability list can refer to a subset of available games. For example, if a controller is held vertically pointing downward, a golf game may be one of a subset to select from, and if the controller is held horizontally, a tennis game and a baseball game would be included in the subset or game availability list.

FIG. 26A is a flowchart illustrating the operation of a gaming system in the receipt of a sequence of user touches to determine game alteration data according to one or more embodiments of the present invention. A game controller or game console processes touch pad input to determine a sequence of user touches based upon the touch pad input, step 2602. At least one corresponding game operation is altered based upon the game alteration data. The sequence of user touches is used to determine all or a portion of game alteration data, step 2604. As was previously described, the sequence of user touches may be fixed for a particular game or may be customized by a user as a shortcut to game operation.

FIG. 26B is a flowchart illustrating the operation of a gaming system in determining game alteration data based upon a difference between current hand/foot position and baseline hand/foot position according to one or more embodiments of the present invention. A baseline hand/foot position is established based upon the touch pad input, step 2652. A current hand/foot position is determined based upon the touch pad input, step 2654. The game alteration data is based upon a difference between the current hand/foot position and the baseline hand/foot position, step 2656. The game alteration may include changing game points, game options, game pieces, difficulty level, etc.

Figure 27:
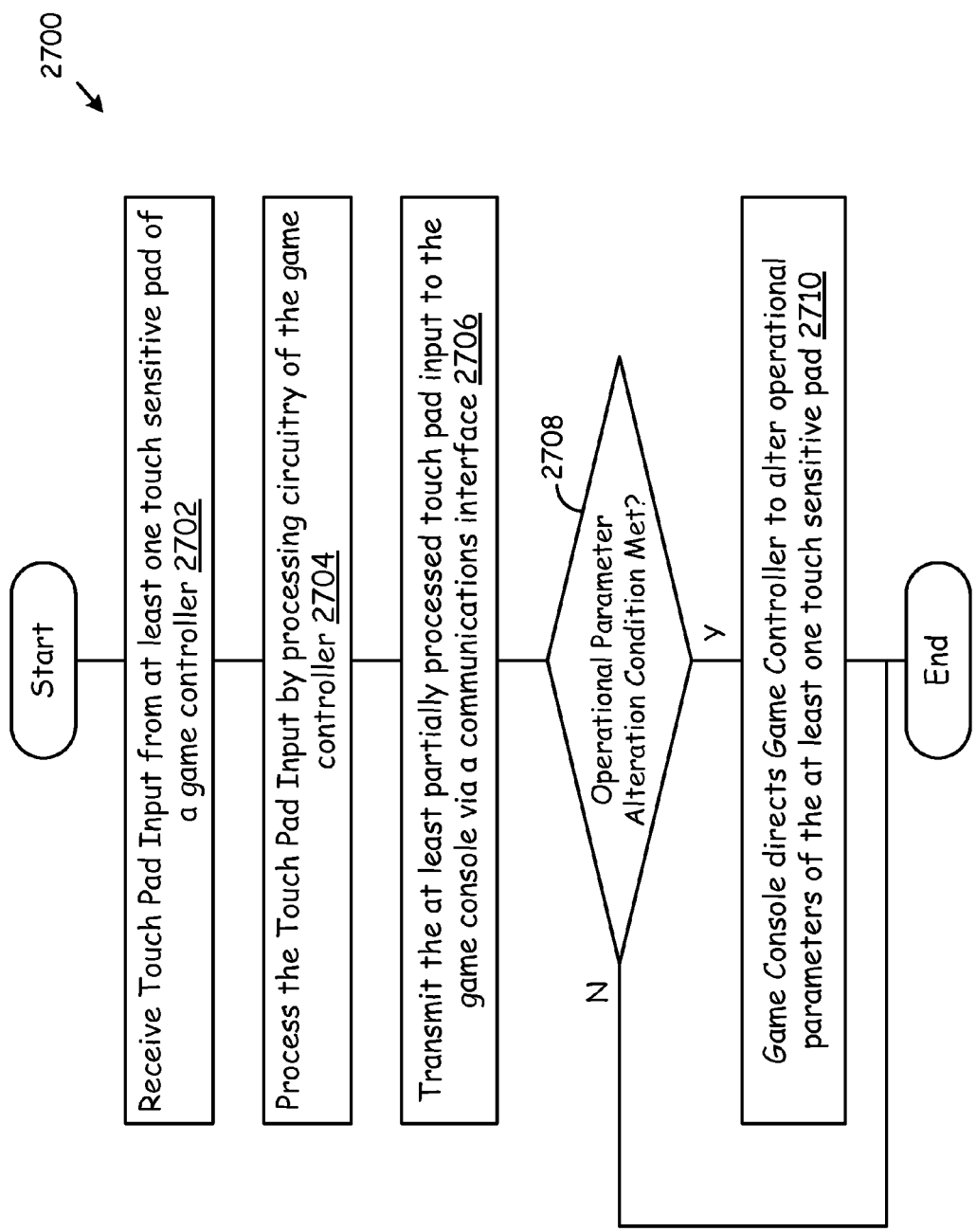
FIG. 27 is a flowchart illustrating the operation of a game console to alter operational parameters of a touch sensitive pad of a game controller according to one or more embodiments of the present invention.

FIG. 27 is a flowchart illustrating the operation 2700 of a game console to alter operational parameters of a touch sensitive pad of a game controller according to one or more embodiments of the present invention. Initial operational parameters of at least one touch sensitive pad of the game controller are set. The touch sensitive pad has a plurality of touch sensitive elements. Touch pad input is received from at least one touch sensitive pad of a game controller, step 2702. The touch pad input corresponds to a user's touch of at least some of the plurality of touch sensitive elements. The touch pad input is at least partially processed by processing circuitry of the game controller, step 2704. The at least partially processed touch pad input is transmitted to a game console via a communications interface of the game controller for processing, step 2706. A determination is made regarding whether an operational parameter alteration condition is met, step 2708. If Yes, the game console directs the game controller to alter operational parameters of the at least one touch sensitive pad, step 2710, and the process ends. If No, the process ends. Operational parameters and the alteration thereof are described further with reference to FIGS. 29 and 30. Operational parameter alteration conditions are described further with reference to FIG. 31.

Figure 28:
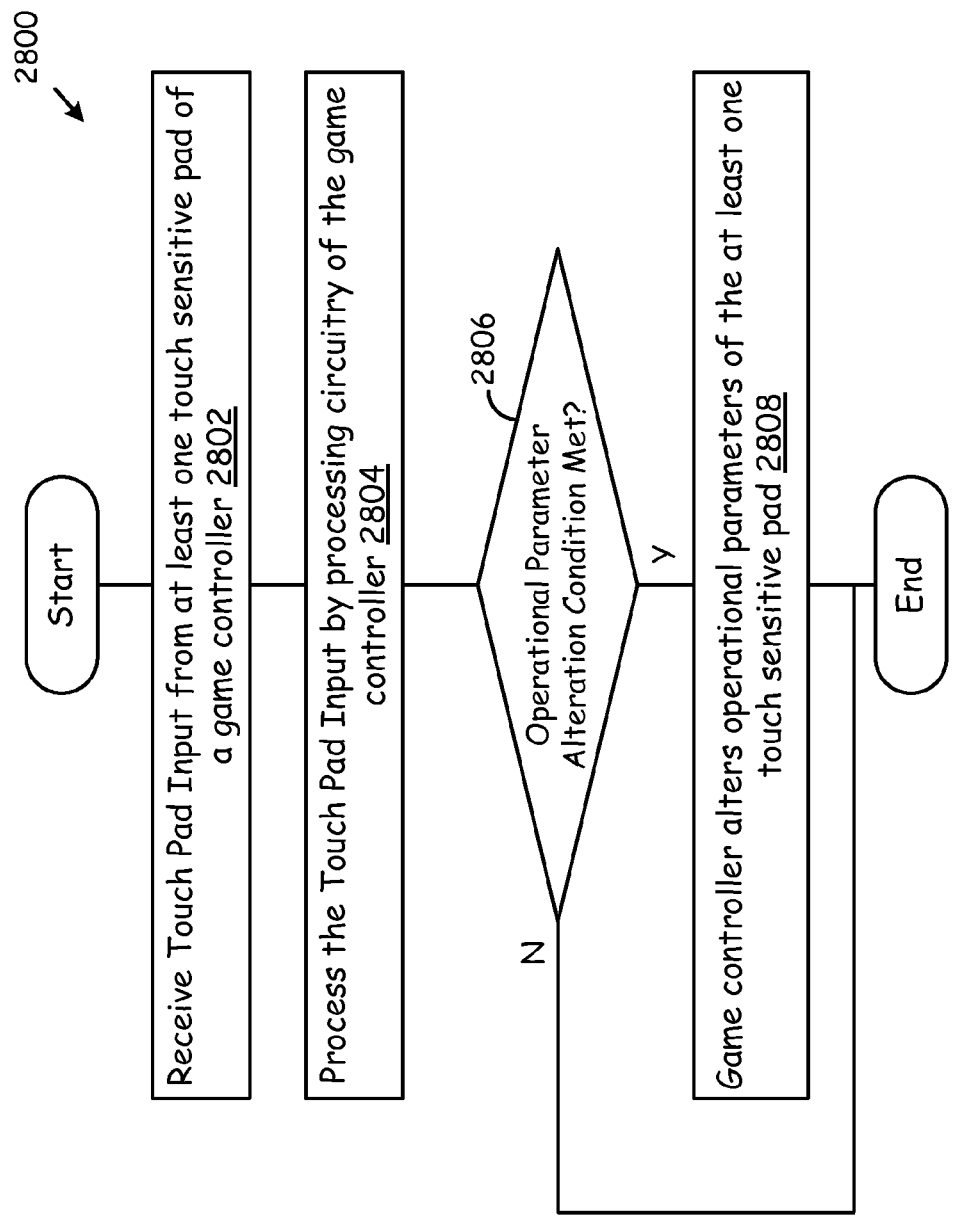
FIG. 28 is a flowchart illustrating the operation of a game controller to alter the operations/operational parameters of a touch sensitive pad according to one or more embodiments of the present invention.

FIG. 28 is a flowchart illustrating the operation 2800 of a game controller to alter the operations/operational parameters of a touch sensitive pad according to one or more embodiments of the present invention. In FIG. 28, there is no interaction with the game console. Operations 2800 begin by setting the initial operational parameters of at least one touch sensitive pad of the game controller are set. The touch sensitive pad has a plurality of touch sensitive elements. Touch pad input is then received from at least one touch sensitive pad of a game controller, step 2802. The touch pad input corresponds to a user's touch of at least some of the plurality of touch sensitive elements. The touch pad input is at least partially processed by processing circuitry of the game controller, step 2804. A determination is made regarding whether an operational parameter alteration condition is met, step 2806. The operational parameter may be based upon touch pad input, expiration of time, batter, and the like. If Yes, the operational parameter is met, then the game controller alters operational parameters of the at least one touch sensitive pad, step 2808, and the process ends. If No, the process ends.

Figure 29:
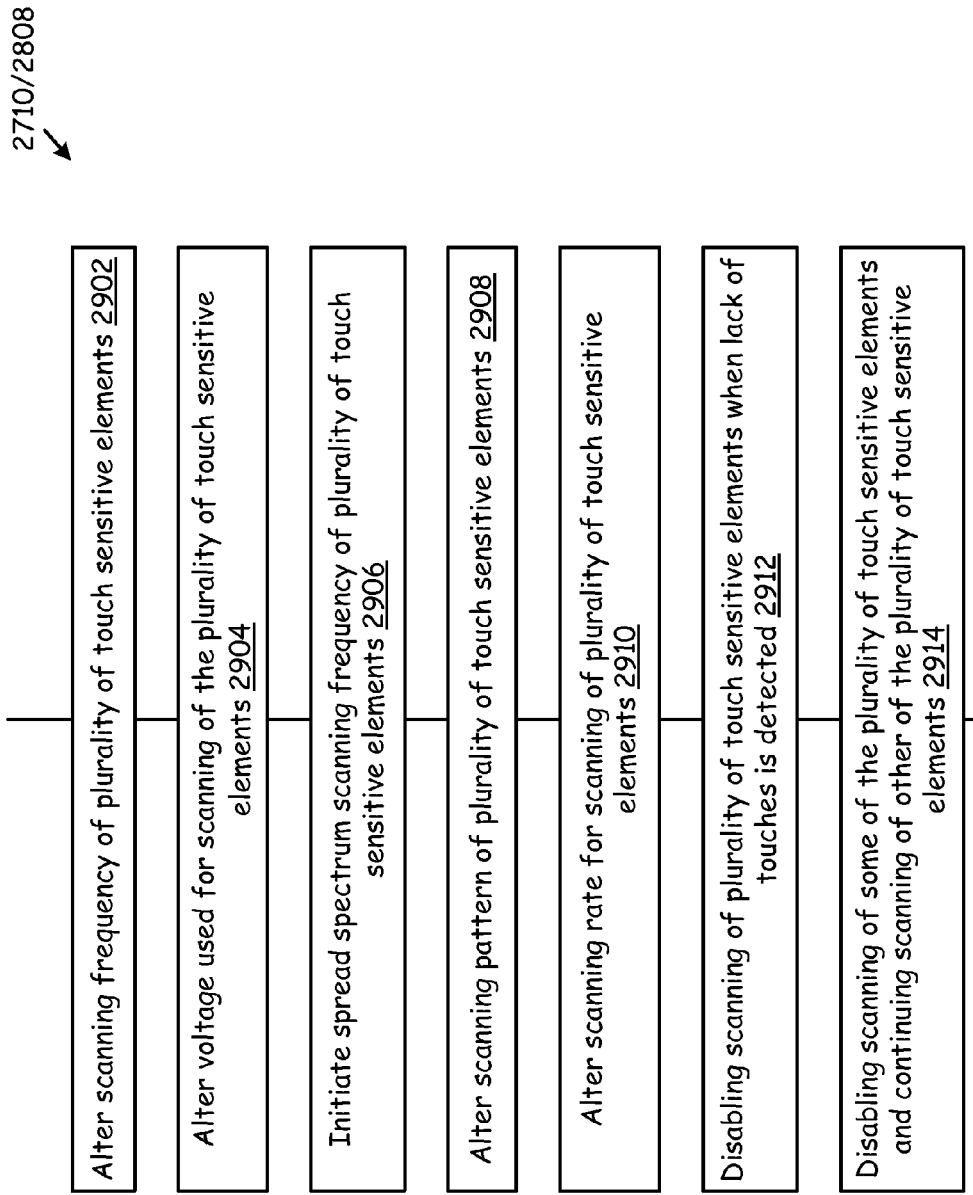
FIG. 29 is a flowchart illustrating various options for altering operations/operational parameters of a touch sensitive pad according to one or more embodiments of the present invention.
Figure 30:
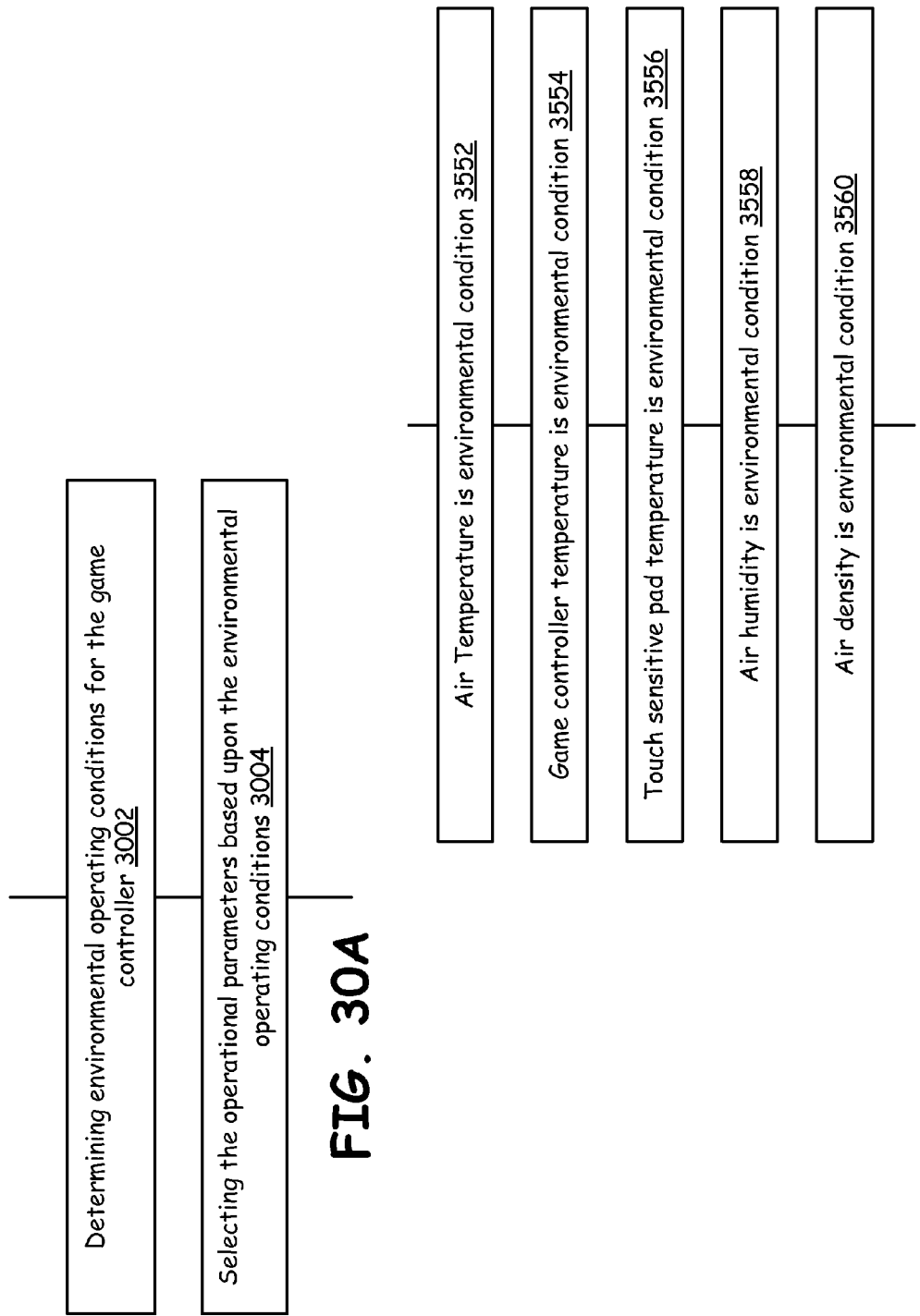
FIG. 30A is a flowchart illustrating the selection of operational parameters of a touch sensitive pad based upon environmental operating conditions according to one or more embodiments of the present invention.
FIG. 30B is a flowchart illustrating various environmental operating conditions that may be used to select operational parameters according to one or more embodiments of the present invention.

FIG. 29 is a flowchart illustrating various options for altering operations/operational parameters of a touch sensitive pad according to one or more embodiments of the present invention. The operations of FIG. 29 are performed in conjunction with step 2710 of FIG. 27, and step 2808 of FIG. 28. Altering the operational parameters of the at least one touch sensitive pad of the game controller includes one or more of the following: altering scanning frequency of a plurality of touch sensitive elements, step 2902; altering voltage used for scanning of the plurality of touch sensitive elements, step 2904; initiating spread spectrum scanning frequency of a plurality of touch sensitive elements, step 2906; altering scanning rate for scanning of a plurality of touch sensitive elements, step 2908; disabling scanning of a plurality of touch sensitive elements when lack of touches is detected, step 2912; and disabling scanning of some of the plurality of touch sensitive elements and continuing scanning of other of the plurality of touch sensitive elements, step 2914.

FIG. 30A is a flowchart illustrating the selection of operational parameters of a touch sensitive pad based upon environmental operating conditions according to one or more embodiments of the present invention. Environmental operating conditions are determined for the game controller, step 3002. The operational parameters are selected based upon the environmental operating conditions, step 3004.

FIG. 30B is a flowchart illustrating various environmental operating conditions that may be used to select operational parameters according to one or more embodiments of the present invention. The environmental operating conditions are one or more of the following: air temperature, step 3552; game controller temperature, step 3554; touch sensitive pad temperature, step 3556; air humidity, step 3558; and air density, step 3560. These parameters are measured at one or more of the game console and the game controller. Alternately, these parameters may be related to the game console or the game controller from an external source such as a local weather station, a web server, or another device/location.

Figure 31:
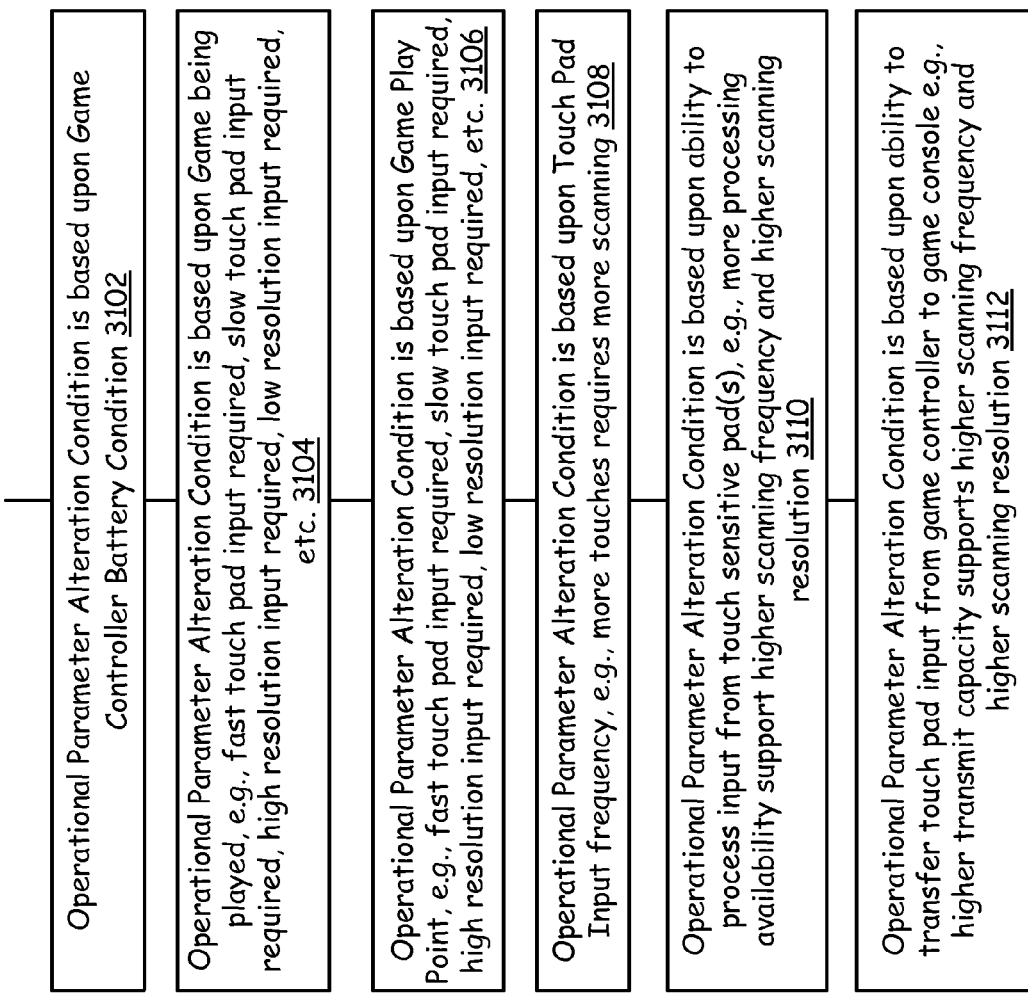
FIG. 31 is a flowchart illustrating usage of various operational parameter alteration conditions to trigger alteration of operational parameters of a touch sensitive pad according to one or more embodiments of the present invention.

FIG. 31 is a flowchart illustrating usage of various operational parameter alteration conditions to trigger alteration of operational parameters of a touch sensitive pad according to one or more embodiments of the present invention. The operations of FIG. 31 are performed in conjunction with step 2708 of FIG. 27, and step 2806 of FIG. 28. Operational parameter alteration conditions are based upon one or more of the following: game controller battery condition, step 3102; game being played (e.g., fast touch pad input required, slow touch pad input required, high resolution input required, low resolution input required, and the like), step 3104; game play point (e.g., fast touch pad input required, slow touch pad input required, high resolution input required, low resolution input required, and the like), step 3106; touch pad input frequency (e.g., more touches requires more scanning), step 3108; ability to process input from touch sensitive pad(s) (e.g., more processing availability support higher scanning frequency and higher scanning resolution), step 3110; and ability to transfer touch pad input from game controller to game console (e.g., higher transmit capacity supports higher scanning frequency and higher scanning resolution), step 3112.

Thus, in the decision blocks of steps 2708 and/or 2806, the game controller or game console considers one or more of the conditions of FIG. 31 to make a decision on whether the operational parameters of one or more touch pads should be altered. If one or more of these conditions 3102 through 3112 of FIG. 31 is met, the operational parameters of the touch pad(s) is/are altered for subsequent operations. Of course, the changes in operational parameters may be temporary or permanent.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output (s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for operating a game controller to identify a user, the method comprising:
   receiving touch pad input from at least one touch sensitive pad of the game controller that has a plurality of touch sensitive elements, the touch pad input corresponding to the user's touch of at least some of the plurality of touch sensitive elements;
   performing first processing operations on the touch pad input by processing circuitry of the game controller to produce partially processed touch pad input;
   wirelessly transmitting the partially processed touch pad input to a game console via a communications interface of the game controller for performing second processing operations on the partially processed touch pad input by the game console, the game console configured to produce fully processed touch pad input for pattern recognition of a user characteristic;
   using user preference information and the fully processed touch pad input to identify the user, the user preference information including game selection, game settings, time of day, day of week, game play duration, game usage level, and auxiliary game controller selection; and
   altering user identification operations for:
      initial user identification operations with which full user identification verification is required;
      intermediate user identification operations with which partial user identification verification is required; and
      automatic user identification operations without requiring user identification verification.

2. The method of claim 1, wherein the performing first processing operations on the touch pad input by processing circuitry of the game controller is selected from the group consisting of:
   identifying at least one finger orientation based upon the touch pad input;
   identifying at least one finger spacing based upon the touch pad input;
   identifying at least one finger width based upon the touch pad input;
   identifying a plurality of finger knuckle/joint locations based upon the touch pad input; and
   identifying a plurality of finger lengths based upon the touch pad input.

3. The method of claim 1, further comprising deleting non-matched users after expiration of a user identification deletion period.

4. The method of claim 1, wherein the touch pad input includes a sequence of user touches serving as a short-hand language input to cause a corresponding operation.

5. The method of claim 1, wherein each of the plurality of touch sensitive elements measures a characteristic at a respective location of the game controller.

6. The method of claim 5, wherein the characteristic comprises at least one of:
   a capacitance;
   an inductance; and
   a radio frequency propagation characteristic.

7. A game controller comprising:
   a communications interface;
   at least one touch sensitive pad having a plurality of touch sensitive elements; and
   processing circuitry coupled to the communications interface and to the at least one touch sensitive pad, the processing circuitry is operable to:
      receive touch pad input from the at least one touch sensitive pad, the touch pad input corresponding to the user's touch of at least some of the plurality of touch sensitive elements;
      perform first processing operations on the touch pad input by processing circuitry of the game controller to produce partially processed touch pad input;

wirelessly transmit the partially processed touch pad input to a game console via the communications perform second processing operations on the partially processed touch pad input by the game console to produce fully processed touch pad input for use to identify the user via pattern recognition of a user characteristic of the fully processed touch pad input, wherein processing operations on the touch pad input are shared between the processing circuitry of the game controller and the game console; and altering user identification operations for:
initial user identification operations with which full user identification verification is required;
intermediate user identification operations with which partial user identification verification is required; and
automatic user identification operations without requiring user identification verification.

8. The game controller of claim 7, wherein in performing the first processing operations on the touch pad input, the processing circuitry is operable to perform operations selected from the group consisting of:
identify at least one finger orientation based upon the touch pad input;
identify at least one finger spacing based upon the touch pad input;
identify at least one finger width based upon the touch pad input;
identify a plurality of finger knuckle/joint locations based upon the touch pad input; and
identify a plurality of finger lengths based upon the touch pad input.

9. The game controller of claim 7, wherein the processing circuitry is further operable to:
receive other touch pad input from at least one touch sensitive pad of a communicatively coupled secondary game controller;
process both the touch pad input and the other touch pad input to produce combined touch pad input; and
transmit the combined touch pad input to the game console for processing to identify the user via pattern recognition of the user characteristic.

10. A method for operating a game console to identify a user, the method comprising:
wirelessly receiving partially processed touch pad input from a game controller via a communications interface, the touch pad input captured by at least one touch sensitive pad of the game controller that has a plurality of touch sensitive elements, the touch pad input corresponding to the user's touch of at least some of the plurality of touch sensitive elements, and processing circuitry of the game controller performing first processing operations on the touch pad input to produce the partially processed touch pad input;
performing second processing operations on the partially processed touch pad input to identify the user via pattern recognition based upon a user finger characteristic of a plurality of user finger characteristics, wherein processing operations on the touch pad input are shared between the processing circuitry of the game controller and the game console; and
altering user identification operations for:
initial user identification operations with which full user identification verification is required;
intermediate user identification operations with which partial user identification verification is required; and
automatic user identification operations without requiring user identification verification.

11. The method of claim 10, wherein the user finger characteristic is selected from the group consisting of:
at least one finger orientation;
at least one finger spacing;
at least one finger width;
a plurality of finger knuckle/joint locations; and
a plurality of finger lengths.

12. The method of claim 10, further comprising:
receiving other touch pad input via the communications interface, the other touch pad input from at least one touch sensitive pad of a secondary game controller;
processing both the touch pad input and the other touch pad input to produce combined touch pad input; and
using the combined touch pad input to identify the user via pattern recognition of the user finger characteristic of the plurality of user finger characteristics.

13. The method of claim 10, further comprising deleting non-matched users after expiration of a user identification deletion period.

14. The method of claim 10, further comprising using user preference information to identify the user, the user preference information including game selection, game settings, time of day, day of week, game play duration, game usage level, and auxiliary game controller selection.

15. A game console comprising:
a communications interface; and
processing circuitry coupled to the communications interface, the processing circuitry operable to:
wirelessly receive partially processed touch pad input from a game controller via the communications interface, the touch pad input captured by at least one touch sensitive pad of the game controller that has a plurality of touch sensitive elements, the touch pad input corresponding to the user's touch of at least some of the plurality of touch sensitive elements, and processing circuitry of the game controller to perform first processing operations on the touch pad input to produce the partially processed touch pad input;
perform second processing operations on the partially processed touch pad input to identify the user via pattern recognition of a finger user characteristic of a plurality of user finger characteristics, wherein processing operations on the touch pad input are shared between the processing circuitry of the game controller and the processing circuitry of the game console; and
the processing circuitry is further operable to separately enact:
initial user identification operations with which full user identification verification is required;
intermediate user identification operations with which partial user identification verification is required; and
automatic user identification operations without requiring user identification verification.

16. The game console of claim 15, wherein the user finger characteristic is selected from the group consisting of:
at least one finger orientation;
at least one finger spacing;
at least one finger width;
a plurality of finger knuckle/joint locations; and
a plurality of finger lengths.

17. The game console of claim 15, wherein the processing circuitry is further operable to:
receive other touch pad input via the communications interface, the other touch pad input from at least one touch sensitive pad of a secondary game controller;

process both the touch pad input and the other touch pad input to produce combined touch pad input; and use the combined touch pad input to identify the user via pattern recognition.

18. The game console of claim 15, wherein the processing circuitry is further operable to delete non-matched users after expiration of a user identification deletion period.

19. The game console of claim 15, wherein the processing circuitry is further operable to use preference information to identify the user, the user preference information including game selection, game settings, time of day, day of week, game play duration, game usage level, and auxiliary game controller selection.

20. The game console of claim 15, wherein the at least some of the plurality of touch sensitive elements measure a characteristic at a respective location of the game controller.

* * * * *

UNITED STATES PATENT AND TRADEMARK OFFICE
CERTIFICATE OF CORRECTION

PATENT NO. : 8,754,746 B2  Page 1 of 1
APPLICATION NO. : 12/912458
DATED : June 17, 2014
INVENTOR(S) : Lukas et al.

It is certified that error appears in the above-identified patent and that said Letters Patent is hereby corrected as shown below:

In the Claims,

Col. 25, line 2, in claim 7: after, "via the communications" insert --interface to--

Signed and Sealed this
Fifteenth Day of September, 2015

Michelle K. Lee
*Director of the United States Patent and Trademark Office*